(12) United States Patent
Dharmaraj et al.

(10) Patent No.: US 10,059,469 B2
(45) Date of Patent: Aug. 28, 2018

(54) PORTAL CHAMBER FOR ENTERING OR EXITING A GRAVITY CHAMBER OF A HABITATION MODULE WHILE THE GRAVITY CHAMBER ROTATES

(71) Applicant: The Boeing Company, Chicago, IL (US)

(72) Inventors: Raju Dharmaraj, League City, TX (US); James Michael Engle, Pearland, TX (US)

(73) Assignee: The Boeing Company, Chicago, IL (US)

( * ) Notice: Subject to any disclaimer, the term of this patent is extended or adjusted under 35 U.S.C. 154(b) by 264 days.

(21) Appl. No.: 14/992,965

(22) Filed: Jan. 11, 2016

(65) Prior Publication Data
US 2017/0197734 A1    Jul. 13, 2017

(51) Int. Cl.
*B64G 1/12* (2006.01)
*B64G 1/60* (2006.01)

(52) U.S. Cl.
CPC ........... *B64G 1/12* (2013.01); *B64G 1/60* (2013.01)

(58) Field of Classification Search
CPC .... B64G 1/12; B64G 1/46; B64G 1/60; F16D 67/02
See application file for complete search history.

(56) References Cited

U.S. PATENT DOCUMENTS

| | | | | |
|---|---|---|---|---|
| 4,643,375 A * | 2/1987 | Allen | ................ | B64G 1/60 244/171.9 |
| 6,216,984 B1 * | 4/2001 | Brinsmade | ................ | B64G 1/12 244/159.4 |
| 6,523,782 B2 * | 2/2003 | Barutt | ................ | B64G 1/12 244/171.9 |
| 9,090,361 B2 * | 7/2015 | Clay | ................ | B64G 1/14 |
| 9,359,091 B2 * | 6/2016 | Biddlecom | ................ | B64G 1/46 |
| 9,776,743 B2 * | 10/2017 | Dharmaraj | ................ | B64G 1/46 |
| 2014/0068858 A1 * | 3/2014 | Wambeke | ................ | A47G 9/062 5/420 |
| 2014/0124627 A1 * | 5/2014 | Clay | ................ | B64G 1/14 244/159.3 |
| 2017/0197734 A1 * | 7/2017 | Dharmaraj | ................ | B64G 1/12 |
| 2017/0197735 A1 * | 7/2017 | Dharmaraj | ................ | B64G 1/46 |
| 2017/0197736 A1 * | 7/2017 | Dharmaraj | ................ | B64G 1/60 |
| 2017/0197738 A1 * | 7/2017 | Dharmaraj | ................ | B64G 1/60 |
| 2017/0240302 A1 * | 8/2017 | Dharmaraj | ................ | B64G 1/60 |
| 2017/0240303 A1 * | 8/2017 | Dharmaraj | ................ | B64G 1/60 |

* cited by examiner

*Primary Examiner* — Philip J Bonzell
*Assistant Examiner* — Michael B Kreiner
(74) *Attorney, Agent, or Firm* — Duft Bornsen & Fettig LLP

(57) ABSTRACT

A habitation module with a gravity chamber that rotates to provide an artificial gravity environment. In one embodiment, a portal chamber is installed adjacent to the gravity chamber and configured to rotate about the same axis. The portal chamber includes a brake mechanism to stop the rotation of the portal chamber, a first access opening for a crew member to pass between an interior of the habitation module and the portal chamber while rotation of the portal chamber is stopped, an engagement mechanism that engages the gravity chamber to rotate the portal chamber about the axis at a speed of the gravity chamber, and a second access opening for the crew member to pass between the portal chamber and the gravity chamber while the portal chamber rotates at the speed of the gravity chamber.

23 Claims, 20 Drawing Sheets

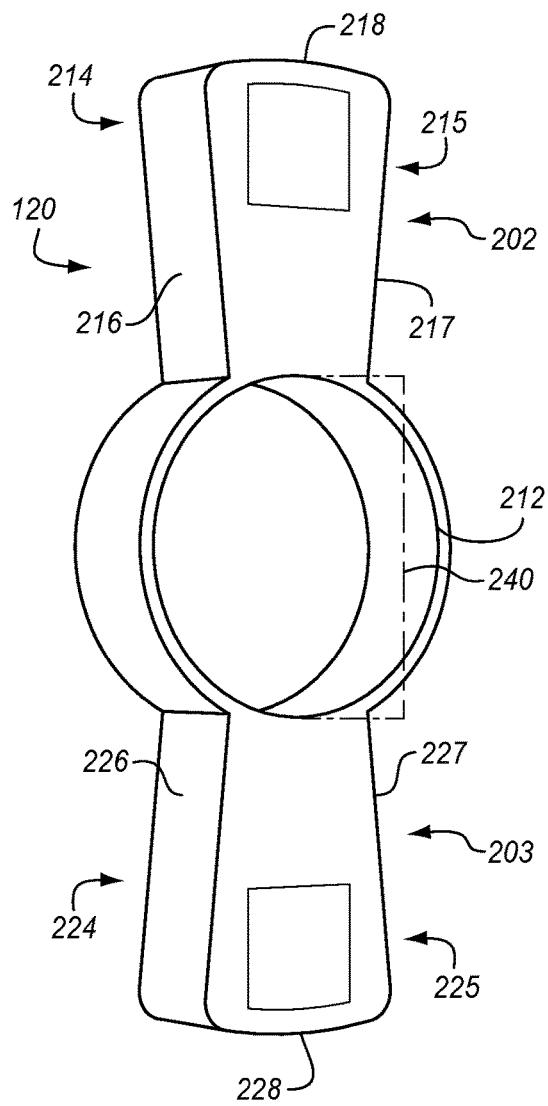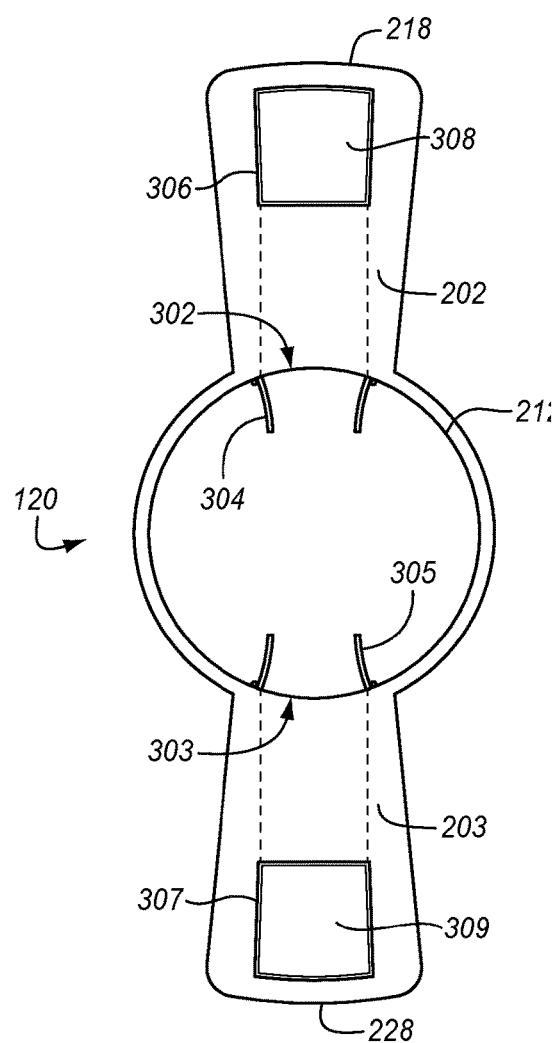

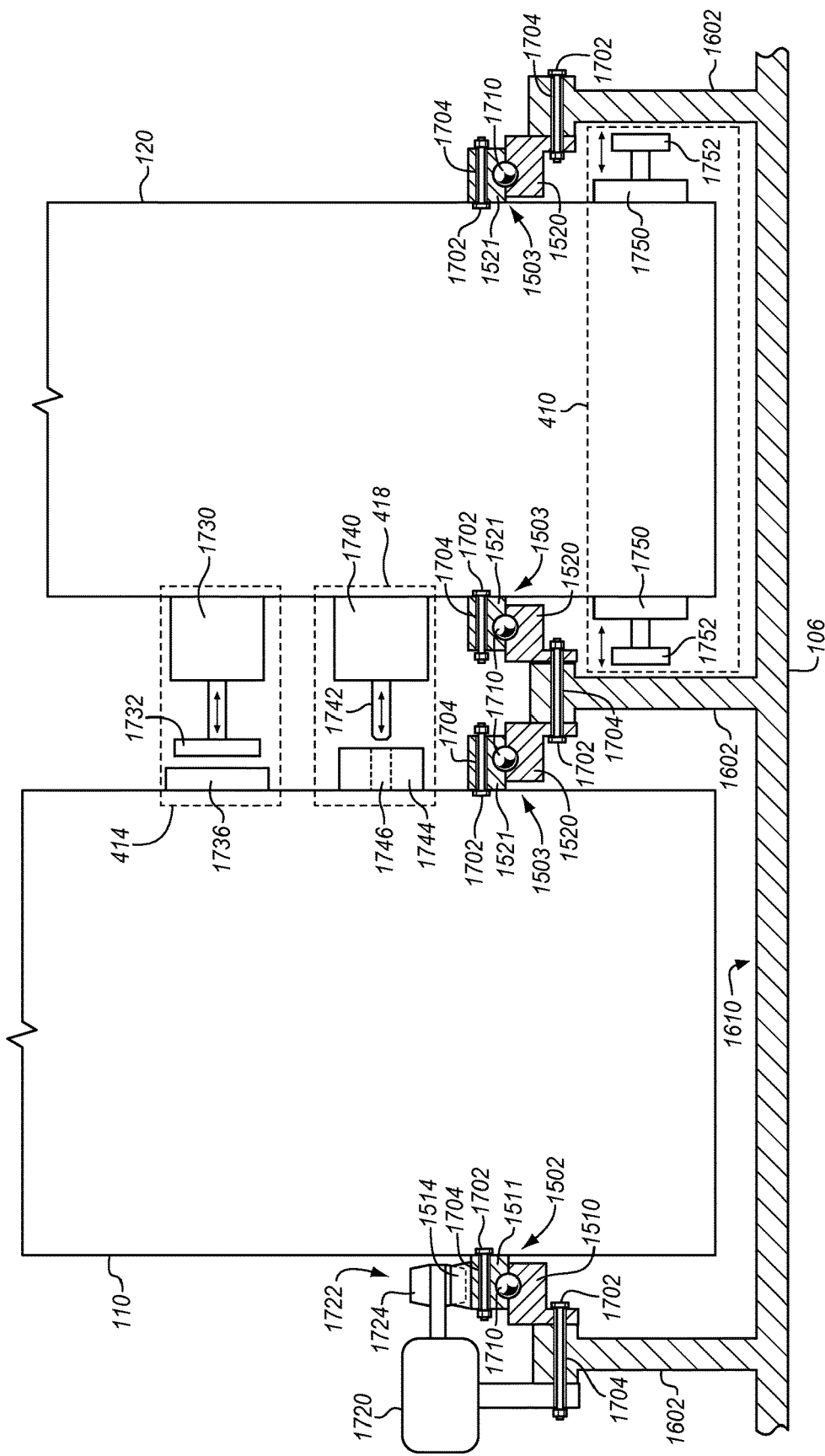

PORTAL CHAMBER FOR ENTERING OR EXITING A GRAVITY CHAMBER OF A HABITATION MODULE WHILE THE GRAVITY CHAMBER ROTATES

FIELD

This disclosure relates to the field of habitation modules that provide artificial gravity environments.

BACKGROUND

When humans occupy a space station, they encounter a zero-gravity environment or "weightless" environment. Extended exposure to a zero-gravity environment can be detrimental to the health of the human occupants, such as muscle and bone degeneration. To avoid these long-term health effects, artificial gravity environments may be installed in the space station. One way to create artificial gravity is with centrifugal force, where a vessel rotates at a speed that drives a human occupant inside of the vessel toward the outer hull of the vessel. The force on the human occupant feels like a gravitational pull. Presently, the rotating vessel needs to be stopped for a human occupant to enter or exit the vessel. Stopping the rotation of the vessel can cause problems for other occupants of the rotating vessel, as the artificial gravity environment will be lost from the time rotation is stopped until the vessel again rotates at the desired speed.

SUMMARY

Embodiments described herein include a habitation module for a space station that includes a gravity chamber for human occupancy. The gravity chamber rotates to simulate artificial gravity within the gravity chamber. The embodiments also describe a portal chamber for entering or exiting the rotating gravity chamber. The portal chamber is installed adjacent to the rotating gravity chamber, and is able to rotate about the same axis as the gravity chamber. To enter the gravity chamber, the portal chamber stops rotating to allow a crew member to enter the portal chamber. The portal chamber then engages the rotating gravity chamber so that it rotates along with the gravity chamber. While rotating with the gravity chamber, the crew member is able to pass from the portal chamber to the gravity chamber. To exit the gravity chamber, the portal chamber rotates along with the gravity chamber while the crew member passes from the gravity chamber to the portal chamber. With the crew member in the portal chamber, the portal chamber disengages from the rotating gravity chamber and stops rotation. The crew member may then exit the portal chamber when it is stopped. The portal chamber is advantageously able to allow crew members in the habitation module to enter or exit a rotating gravity chamber without stopping the rotation of the gravity chamber.

One embodiment comprises a habitation module that includes a gravity chamber that rotates about an axis to simulate a gravitational force within the gravity chamber. The habitation module further includes a portal chamber adjacent to the gravity chamber and configured to rotate about the axis. The portal chamber includes a brake mechanism for stopping the rotation of the portal chamber about the axis, a first access opening for a crew member to pass between an interior of the habitation module and the portal chamber while rotation of the portal chamber is stopped, an engagement mechanism that engages the gravity chamber to rotate the portal chamber about the axis at a speed of the gravity chamber, and a second access opening for the crew member to pass between the portal chamber and the gravity chamber while the portal chamber rotates at the speed of the gravity chamber.

In another embodiment, the engagement mechanism disengages from the gravity chamber; and the brake mechanism stops the rotation of the portal chamber.

In another embodiment, the engagement mechanism includes an actuator device that applies pressure with a friction pad to a surface of the gravity chamber to engage the gravity chamber, and reduces the pressure with the friction pad to the surface of the gravity chamber to disengage from the gravity chamber.

In another embodiment, the actuator device of the engagement mechanism gradually increases the pressure with the friction pad to the surface of the gravity chamber to gradually accelerate rotation of the portal chamber to the speed of the gravity chamber In another embodiment, the portal chamber further includes a lock mechanism that secures the portal chamber to the gravity chamber.

In another embodiment, the lock mechanism is positioned on the portal chamber so that the lock mechanism interlocks with the gravity chamber when the second access opening of the portal chamber is directly adjacent to an access opening of the gravity chamber.

In another embodiment, the second access opening of the portal chamber includes a door that opens only when the lock mechanism is interlocked with the gravity chamber.

In another embodiment, the portal chamber includes an inner cylindrical structure and compartments that extend from the inner cylindrical structure in opposing directions. The interior of the compartments are hollow to form a corridor through which crew members are able to move.

In another embodiment, the gravity chamber is annular and includes an inner cylindrical structure, an outer cylindrical wall, and opposing side walls that connect the outer cylindrical wall and the inner cylindrical structure.

In another embodiment, the gravity chamber is hollow between the inner cylindrical structure, the outer cylindrical wall, and the side walls. The inner surface of the outer cylindrical wall is lined with a material for an exercise track.

In another embodiment, the gravity chamber includes a plurality of partitions that extend radially from the inner cylindrical structure to the outer cylindrical wall between the side walls to define compartments within the gravity chamber.

In another embodiment, the portal chamber is annular and includes an inner cylindrical structure, an outer cylindrical wall, and opposing side walls that connect the outer cylindrical wall and the inner cylindrical structure.

In another embodiment, the portal chamber is hollow between the inner cylindrical structure, the outer cylindrical wall, and the side walls for an exercise track. The gravity chamber includes a plurality of partitions that extend radially from the inner cylindrical structure to the outer cylindrical wall of the gravity chamber between the side walls to define compartments within the gravity chamber.

In another embodiment, the gravity chamber includes a divider orthogonal to the axis that divides the gravity chamber into a first annular sub-chamber and a second annular sub-chamber. The annular sub-chamber is hollow between the inner cylindrical structure, the outer cylindrical wall, and the side walls for an exercise track. The second annular sub-chamber includes a plurality of partitions that extend radially from the inner cylindrical structure to the outer cylindrical wall between the side walls to define compartments within the second annular sub-chamber.

In another embodiment, the habitation module further includes support bearings for attaching the portal chamber to the habitation module. The habitation module has a hull that defines an outer diameter of the habitation module, and a cylindrical core member encapsulated by the hull that extends through a center of the habitation module.

In another embodiment, the support bearings each include an inner race attached to the cylindrical core member of the habitation module, and an outer race attached to the portal chamber.

In another embodiment, the support bearings each include an outer race attached to an inner surface of the hull, and an inner race attached to the portal chamber.

In another embodiment, the support bearings each include an inner race attached to an outer surface of the hull, and an outer race attached to the portal chamber.

Another embodiment comprises a method of accessing a gravity chamber of a habitation module. The method includes rotating a gravity chamber about an axis to simulate a gravitational force within the gravity chamber, and rotating a portal chamber about the axis adjacent to the gravity chamber. The method includes stopping the rotation of the portal chamber about the axis with a brake mechanism for a crew member to enter the portal chamber through a first access opening from an interior of the habitation module, and engaging the gravity chamber with an engagement mechanism of the portal chamber to rotate the portal chamber about the axis at a speed of the gravity chamber for the crew member to pass through a second access opening of the portal chamber to an access opening of the gravity chamber.

In another embodiment, the method includes locking the portal chamber to the gravity chamber with a lock mechanism when the second access opening of the portal chamber is directly adjacent to the access opening of the gravity chamber.

In another embodiment, the step of engaging the gravity chamber with the engagement mechanism comprises applying pressure with a friction pad to a surface of the gravity chamber to engage the gravity chamber.

Another embodiment comprises a method of exiting a gravity chamber of a habitation module. The method includes rotating a gravity chamber about an axis to simulate a gravitational force within the gravity chamber, and rotating a portal chamber adjacent to the gravity chamber by engaging the gravity chamber with an engagement mechanism of the portal chamber to rotate the portal chamber about the axis at a speed of the gravity chamber. A crew member is able to pass through an access opening of the gravity chamber to a first access opening of the portal chamber while the portal chamber rotates at the speed of the gravity chamber. The method includes disengaging the portal chamber from the gravity chamber, and stopping the rotation of the portal chamber about the axis with a brake mechanism to enable the crew member to exit the portal chamber through a second access opening into an interior of the habitation module.

In another embodiment, the method further includes locking the portal chamber to the gravity chamber with a lock mechanism when crew member passes through the access opening of the gravity chamber to the first access opening of the portal chamber, and unlocking the portal chamber from the gravity chamber with the lock mechanism before disengaging the portal chamber from the gravity chamber.

In another embodiment, the step of disengaging the portal chamber from the gravity chamber comprises reducing pressure with a friction pad to a surface of the gravity chamber to disengage from the gravity chamber.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments of the present invention are now described, by way of example only, with reference to the accompanying drawings. The same reference number represents the same element or the same type of element on all drawings.

FIG. 2 illustrates a portal chamber of a habitation module in an exemplary embodiment.

FIG. 3 is a side view of a portal chamber of a habitation module in an exemplary embodiment.

FIG. 17 illustrates attachment of a gravity chamber and a portal chamber to a cylindrical core member of a habitation module in an exemplary embodiment.

DETAILED DESCRIPTION

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure, and are to be construed as being without limitation. As a result, this disclosure is not limited to the specific embodiments or examples described below, but by the claims and their equivalents.

Figure 1:
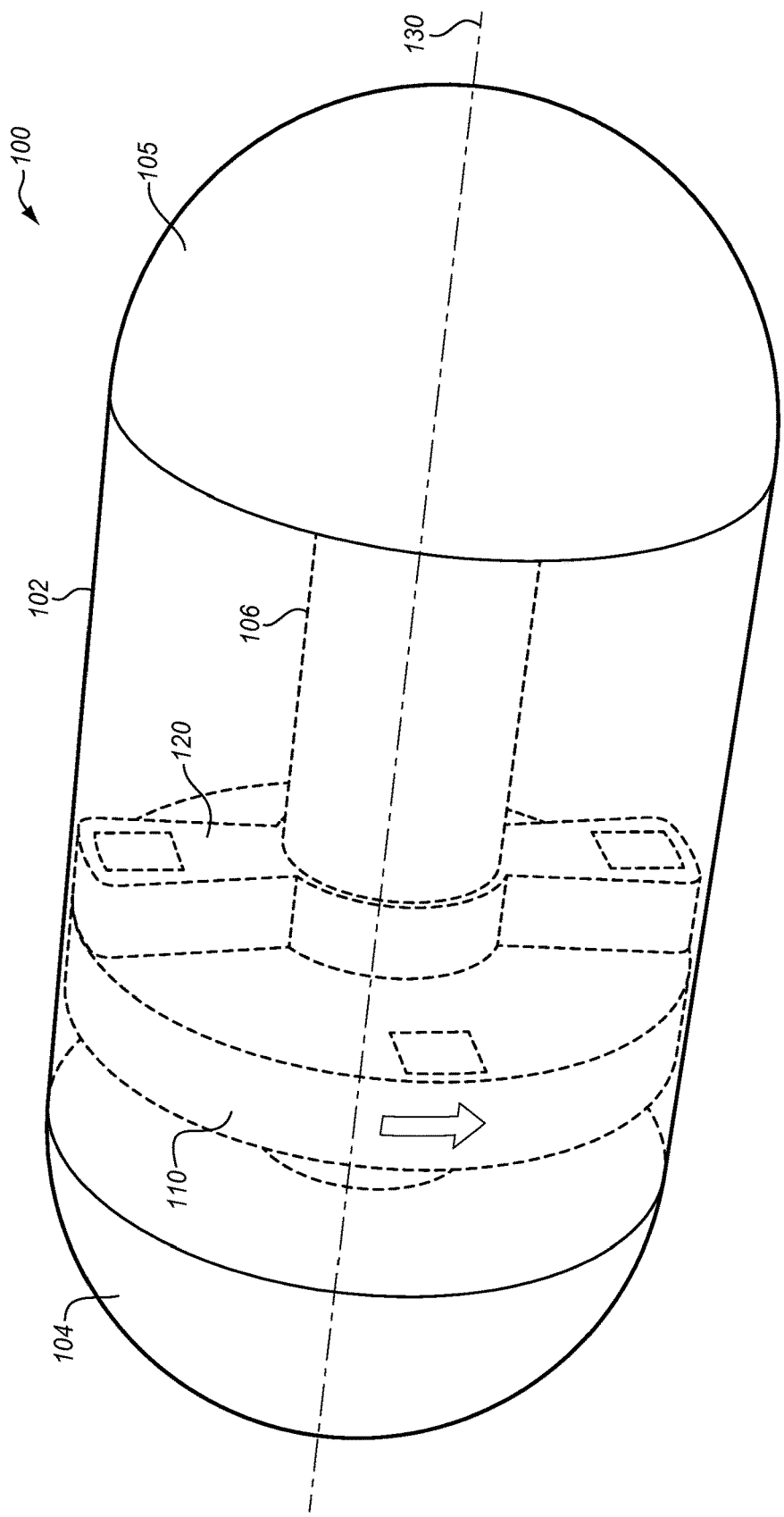
FIG. 1 illustrates a habitation module in an exemplary embodiment.

FIG. 1 illustrates a habitation module 100 in an exemplary embodiment. Habitation module (HAB) 100 is a module used for living quarters for crew members of a space station, such as the International Space Station. For example, HAB 100 may be used for sleeping quarters, restroom facilities, medical facilities, exercise facilities, etc. HAB 100 is configured for space vehicles in Low-Earth Orbit (LEO) or Beyond Low-Earth Orbit (BLEO).

HAB 100 is illustrated as a cylindrical capsule with a hull 102 that encapsulates the modules and systems of HAB 100. Hull 102 is the rigid outer body or fuselage of HAB 100 that defines its outer diameter, which may be about 8.4 meters. The outer diameter of HAB 100 may be limited by the size of the launch vehicle used to transport HAB 100 into space. For example, a Space Launch System (SLS) from NASA may be used to transport HAB 100 into space, and the outer diameter of HAB 100 may be constrained by the size of the SLS. Although not shown in FIG. 1, at least a portion of the interior of hull 102 may be pressurized and supplied with oxygen. Either (or both) of the ends 104-105 of hull 102 may be attached to other modules of a space station. The structure of HAB 100 may also include a cylindrical core member 106 that extends through a center of HAB 100. The diameter of cylindrical core member 106 may be about 4.3 meters.

In order to provide an artificial gravity environment for the crew members, HAB 100 is equipped with one or more gravity chambers 110 that rotate about an axis 130. Gravity chamber 110 rotates at a speed to create an artificial gravity environment by simulating gravitational forces. For example, gravity chamber 110 may rotate at 8 rpm, 10 rpm, 12 rpm, etc. Gravity chamber 110 may attach to cylindrical core member 106, outer hull 102, or a combination of the two to rotate about axis 130.

HAB 100 is also equipped with a portal chamber 120. Portal chamber 120 comprises the chamber used to access gravity chamber 110 while gravity chamber 110 is rotating. When gravity chamber 110 rotates (such as in the direction indicated by the arrow), the rotation creates artificial gravity within gravity chamber 110. Crew members within gravity chamber 110 are able to eat, sleep, shower, exercise, etc., in the artificial gravity. If gravity chamber 110 had to be stopped each time a crew member entered or exited gravity chamber 110, this would be inconvenient for the other crew members still residing within gravity chamber 110. Portal chamber 120 is equipped in HAB 100 so that crew members are able to enter and exit gravity chamber 110 without having to stop the rotation of gravity chamber 110 and interrupt the artificial gravity environment.

As an overview, portal chamber 120 is able to rotate on the same axis 130 as gravity chamber 110. Portal chamber 120 is stopped to allow a crew member to enter portal chamber 120 from an interior of HAB 100, such as the interior of cylindrical core member 106. With the crew member in portal chamber 120, a mechanism engages gravity chamber 110 to begin rotating portal chamber 120 at the same speed as gravity chamber 110. The crew member may then pass from portal chamber 120 to gravity chamber 110 without having to change the rotational speed of gravity chamber 110. To exit gravity chamber 110, the portal chamber 120 again rotates at the same speed as gravity chamber 110 while the crew member passes from gravity chamber 110 to portal chamber 120. The portal chamber 120 is disengaged from the gravity chamber 110 and begins to slow in rotation until it stops. The crew member may then exit portal chamber 120 into the interior of HAB 100. Because portal chamber 120 may be used to transport a crew member from a center of HAB 100 to an outer diameter of gravity chamber 110, portal chamber 120 may also be referred to as an elevator chamber.

FIG. 2 illustrates portal chamber 120 of HAB 100 in an exemplary embodiment. In this embodiment, portal chamber 120 includes an inner cylindrical structure 212, and two or more compartments 202-203 that extend from inner cylindrical structure 212 in opposing directions. Inner cylindrical structure 212 may comprise a cylindrical wall made from a material, such as a thin metal, a composite material, a plastic, or another type of rigid material. Inner cylindrical structure 212 may additionally or alternatively comprise a frame with surfaces, ribs, support members, etc., for attaching portal chamber 120 to HAB 100 so that it may rotate about axis 130. Due to its cylindrical shape, inner cylindrical structure 212 has an axial hole 240 through its center that fits over cylindrical core member 106 or over hull 102 of HAB 100.

Even though the structure may vary, compartment 202 is shown with a pair of opposing side walls 214-215, opposing end walls 216-217, and an outer wall 218. Outer wall 218 is the outermost surface of compartment 202. Compartment 203 is shown with a pair of opposing side walls 224-225, opposing end walls 226-227, and an outer wall 228. Outer wall 228 is the outermost surface of compartment 203. Any of the walls for compartments 202-203 may be made from a rigid material, such as a thin metal, a composite material, a plastic, etc., may be made from a soft material, such as Kevlar®, canvas, or another type of fabric, or may be made from a combination of a rigid material and soft material.

The interior of compartments 202-203 are largely hollow and form a corridor through which crew members are able to move. FIG. 3 is a side view of portal chamber 120 in an exemplary embodiment. In this view, portal chamber 120 includes access openings 302-303, where a crew member is able to pass between an interior of HAB 100 and portal chamber 120. Portal chamber 120 may include access doors 304-305 that open and close to control the pathway through access openings 302-303. Portal chamber 120 also includes access openings 306-307 that allow crew members to pass between portal chamber 120 and an access opening of gravity chamber 110. Access openings 306-307 have a size large enough for a crew member to pass through, and may include a door 308-309 and a mechanism for opening and closing the door, such as a latch, a zipper, etc. Although not visible in FIG. 3, each compartment 202-203 may include a safety harness that crew members may use to secure themselves when located within compartments 202-203.

The structure of portal chamber 120 as shown in FIGS. 1-3 is just an example, and may vary as desired. For example, portal chamber 120 may be annular in other embodiments much like the shape of gravity chamber 110.

Figure 4:
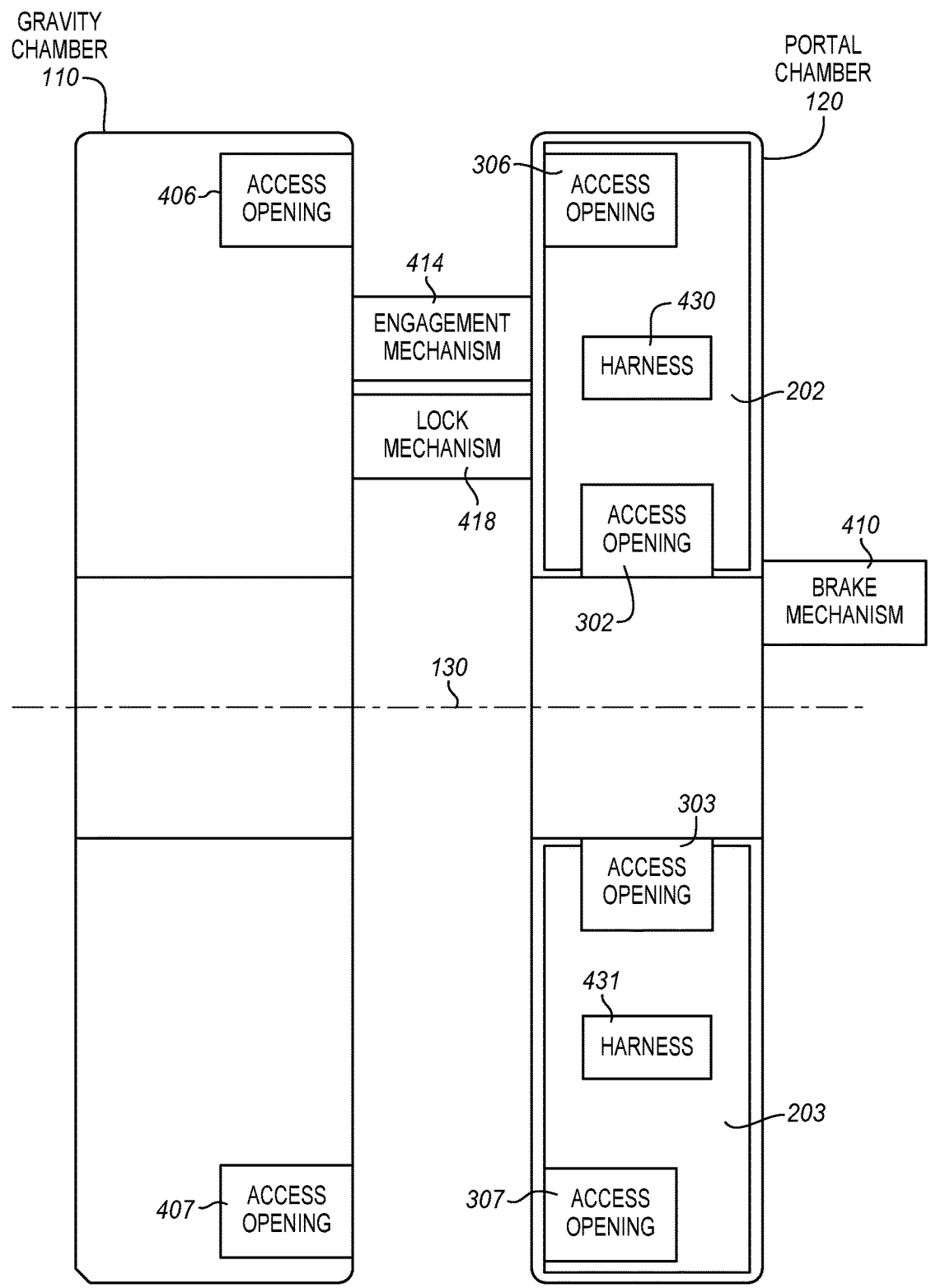
FIG. 4 is a schematic diagram of a portal chamber and a gravity chamber in an exemplary embodiment.

FIG. 4 is a schematic diagram of portal chamber 120 and gravity chamber 110 in an exemplary embodiment. Gravity chamber 110 includes access openings 406-407. Access openings 406-407 allow crew members to access the inside of gravity chamber 110. Access openings 406-407 have a size large enough for a crew member to pass through, and may include a door and a mechanism for opening and closing the door, such as a latch, a zipper, etc. Compartment 202 of portal chamber 120 is a substantially hollow corridor for a crew member to pass between access opening 302 and access opening 306. Similarly, compartment 203 is a substantially hollow corridor for a crew member to pass between access opening 303 and access opening 307. Compartments 202-203 may include safety harnesses 430-431 that are used to secure crew members within compartments 202-203 as portal chamber 120 rotates.

Portal chamber 120 includes a brake mechanism 410 that is configured to stop rotation of portal chamber 120 about axis 130. Brake mechanism 410 may have any desired configuration that slows and stops portal chamber 120 so that a crew member may enter or exit portal chamber 120.

Portal chamber 120 also includes an engagement mechanism 414 that is configured to catch, grip, or otherwise couple with gravity chamber 110 or a drive mechanism for gravity chamber 110 to impart rotation onto portal chamber 120. To allow a crew member to pass from portal chamber 120 to gravity chamber 110, portal chamber 120 is initially stationary. Engagement mechanism 414 is used to create a coupling with gravity chamber 110 (which is rotating) so that portal chamber 120 begins to rotate and accelerate to the rotationally velocity of gravity chamber 110 so that the rotation of portal chamber 120 is synchronized with the rotation of gravity chamber 110. Engagement mechanism 414 is also able to disengage from gravity chamber 110 so that portal chamber 120 becomes decoupled from gravity chamber 110. The design of engagement mechanism 414 may vary as desired. In one example, engagement mechanism 414 may include an actuator (e.g., a pneumatic device) that applies pressure with a friction pad against a surface of gravity chamber 110 to engage gravity chamber 110, and reduces the pressure with the friction pad against the surface of gravity chamber 110 to disengage from gravity chamber 110. In another example, engagement mechanism 414 may include a clutch mechanism that allows portal chamber 120 to couple with gravity chamber 110 and rotate at the same speed, and decouple from gravity chamber 110 and rotate at a different speed (and stop). Because of engagement mechanism 414, portal chamber 120 does not need an independent drive mechanism.

Portal chamber 120 also includes a lock mechanism 418 that is configured to lock or secure portal chamber 120 to gravity chamber 110. Lock mechanism 418 may be engaged to ensure that portal chamber 120 is safely secured to gravity chamber 110 before crew members attempt to pass between portal chamber 120 and gravity chamber 110. The design of lock mechanism 418 may vary as desired. In one example, lock mechanism 418 comprises one or more spring-loaded pins that press into corresponding holes on gravity chamber 110. Lock mechanism 418 may also be used to align access openings 306-307 on portal chamber 120 with access openings 406-407 on gravity chamber 110. For instance, lock mechanism 418 may be positioned on portal chamber 120 so that it interlocks with gravity chamber 110 when an access opening 306-307 of portal chamber 120 is directly adjacent to an access opening 406-407 of gravity chamber 110.

Figure 5:
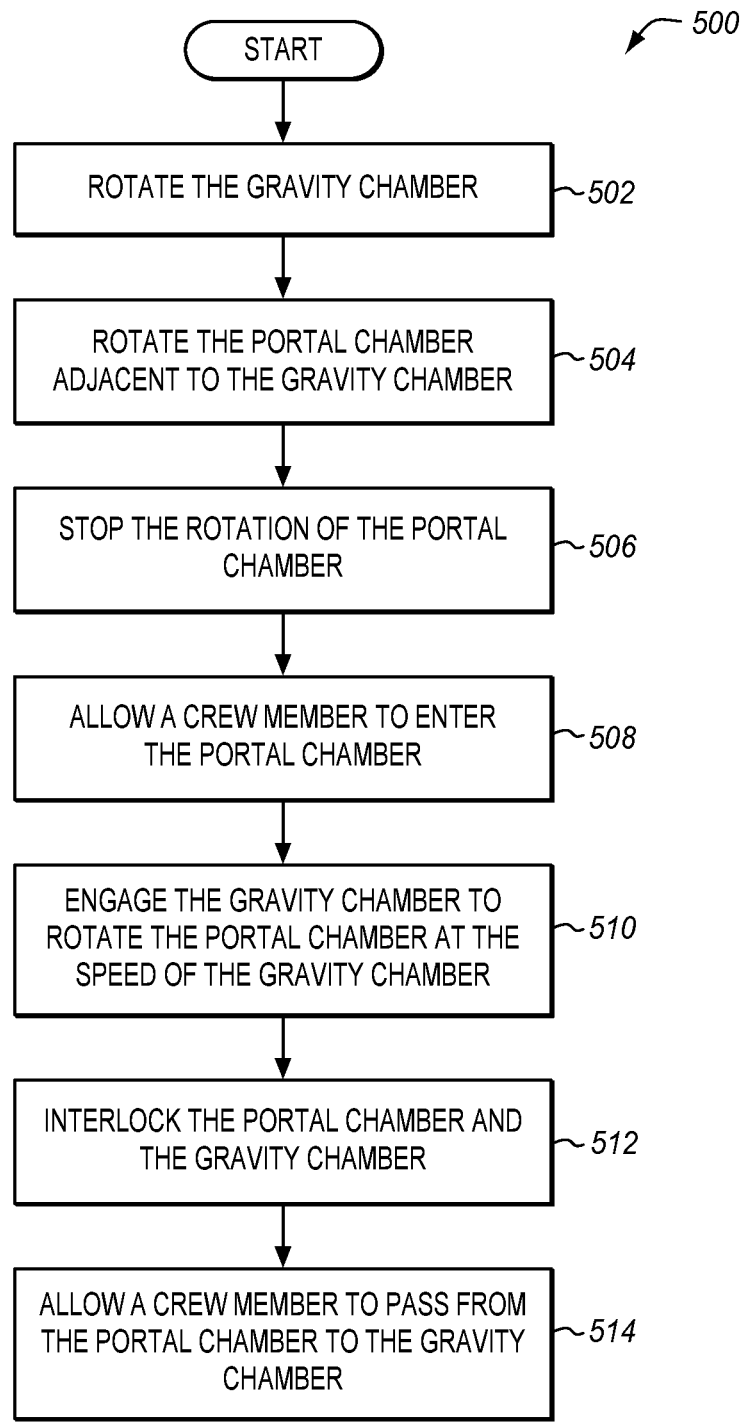
FIG. 5 is a flow chart illustrating a method of accessing a gravity chamber using a portal chamber in an exemplary embodiment.

FIG. 5 is a flow chart illustrating a method 500 of accessing gravity chamber 110 using portal chamber 120 in an exemplary embodiment. The steps of method 500 will be described with reference to HAB 100 in FIG. 1, but those skilled in the art will appreciate that method 500 may be performed in other systems. Also, the steps of the flow charts described herein are not all inclusive and may include other steps not shown, and the steps may be performed in an alternative order.

For method 500, gravity chamber 110 rotates about axis 130 to simulate gravitational force within gravity chamber 110 (step 502). Portal chamber 120 may also be rotating about axis 130 adjacent to gravity chamber 110 (step 504). It is assumed that a crew member in HAB 100 wants to enter gravity chamber 110 through portal chamber 120. For a crew member to be able to enter portal chamber 120, the rotation of portal chamber 120 is stopped (step 506). For example, brake mechanism 410 may be used to slow the rotation of portal chamber 120 until it comes to a complete stop. While portal chamber 120 is stopped, a crew member is allowed to enter portal chamber 120 (step 508). For example, the door 305 (see FIG. 3) for access opening 303 may be locked, and then unlocked when portal chamber 120 is stopped. Thus, a crew member is able to open door 305 and enter portal chamber 120.

Figure 6:
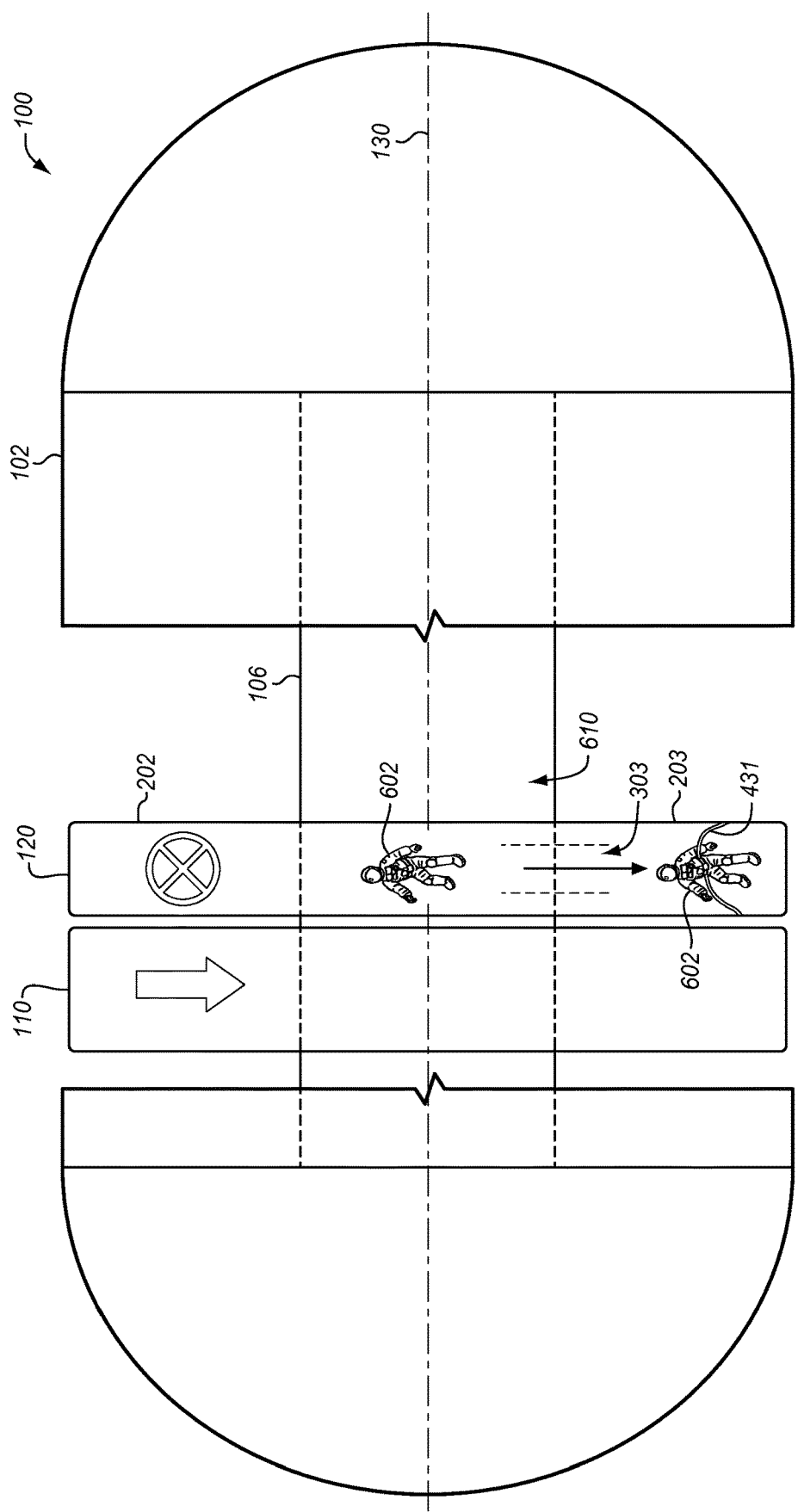
FIGS. 6-7 illustrate a crew member accessing a gravity chamber in an exemplary embodiment.
Figure 7:
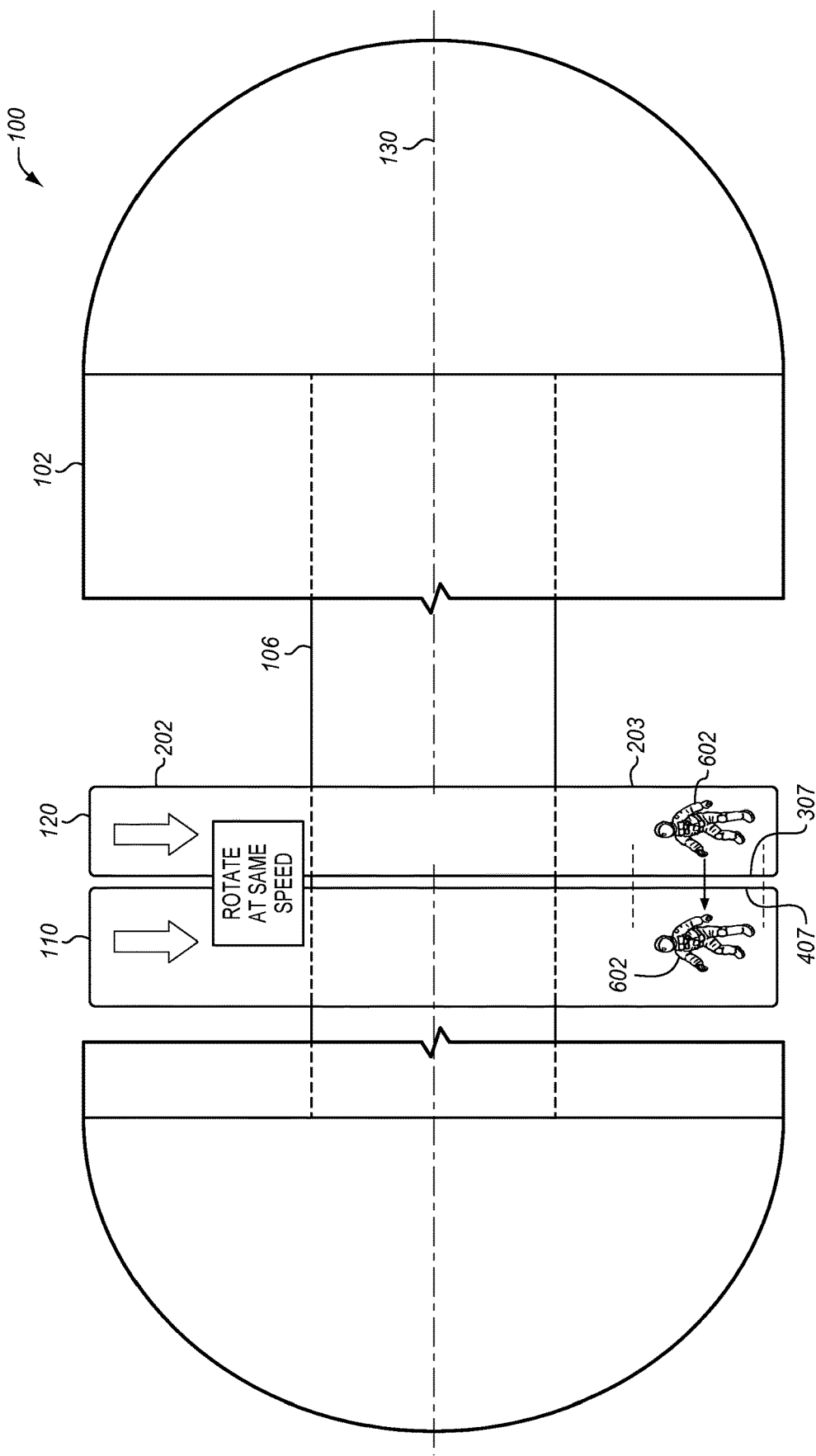

FIGS. 6-7 illustrate a crew member accessing gravity chamber 110 in an exemplary embodiment. In FIG. 6, gravity chamber 110 is rotating, and portal chamber 120 has been stopped, such as with brake mechanism 410. With portal chamber 120 stopped, a crew member 602 may pass from the interior 610 of HAB 100, through access opening 303, and into the interior of compartment 203 within portal chamber 120 (see also FIG. 4). Crew member 602 may secure themselves in compartment 203 with safety harness 431. With crew member 602 properly secured within compartment 203, engagement mechanism 414 (see FIG. 4) engages or otherwise makes contact with gravity chamber 110 to rotate portal chamber 120 about axis 130 at the speed of gravity chamber 110 (step 510 of FIG. 5). Engagement mechanism 414 may gradually engage gravity chamber 110 so that crew member 602 is not subjected to a jarring movement. For example, engagement mechanism 414 may gradually increase the pressure with a friction pad against the surface of gravity chamber 110 to gradually accelerate the rotation of portal chamber 120 to match the speed of gravity chamber 110. Lock mechanism 418 may also interlock with gravity chamber 110 to ensure that portal chamber 120 is securely coupled to gravity chamber 110 before crew member 602 attempts to travel from portal chamber 120 to gravity chamber 110 (step 512). With portal chamber 120 rotating at the same speed as gravity chamber 110, crew member 602 is allowed to pass from portal chamber 120 to gravity chamber 110 (step 514). The door 309 (see FIG. 3) of access opening 307 may be locked until it is directly adjacent to access opening 407 of gravity chamber 110. The door 309 of access opening 307 may also be locked and only opens when lock mechanism 418 is engaged so that crew member 602 can safely pass from portal chamber 120 to gravity chamber 110.

FIG. 7 shows crew member 602 passing from portal chamber 120 to gravity chamber 110. When portal chamber 120 is interlocked with gravity chamber 110, access opening 307 of portal chamber 120 is adjacent to access opening 407 of gravity chamber 110 so that crew member 602 may pass through access opening 307 of portal chamber 120 and access opening 407 of gravity chamber 110 to enter the interior of gravity chamber 110. Crew member 602 will encounter an artificial gravity environment inside of gravity chamber 110 due to its rotation. Portal chamber 120 advantageously allows crew member 602 to access gravity chamber 110 without having to stop the rotation of gravity chamber 110. Therefore, other occupants in gravity chamber 110 are not bothered by entry of crew member 602.

Figure 8:
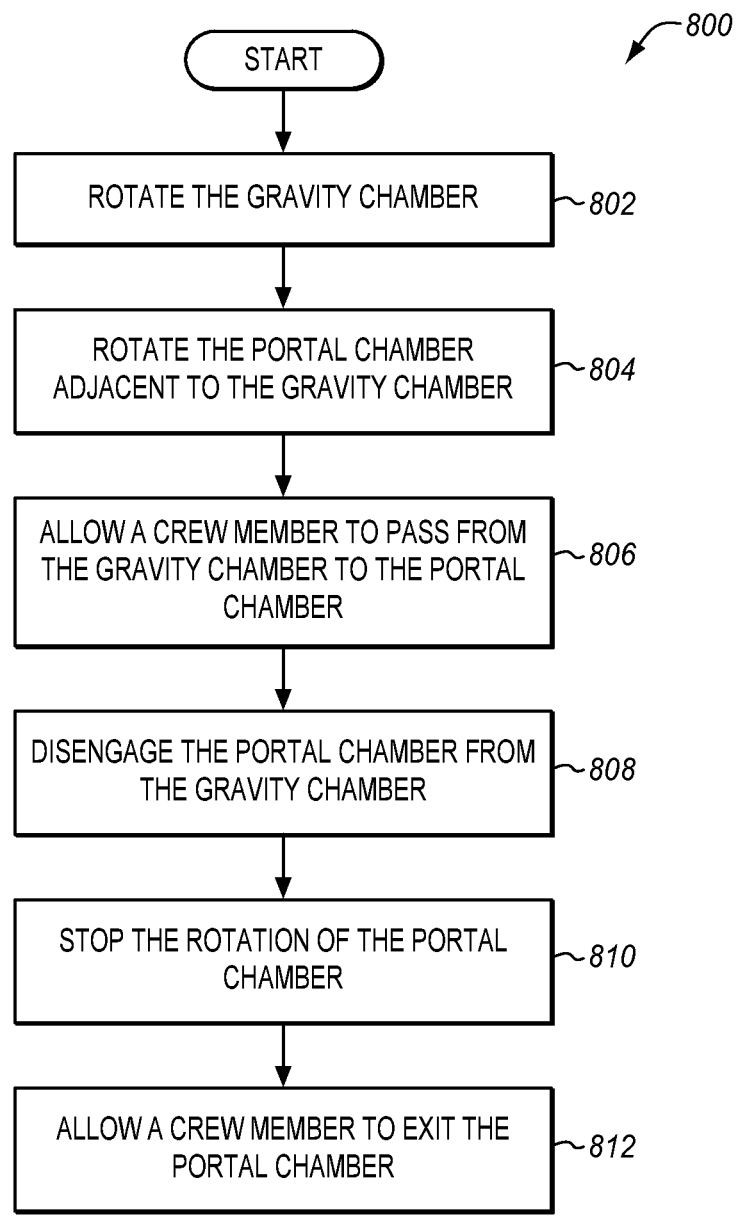
FIG. 8 is a flow chart illustrating a method of exiting a gravity chamber using a portal chamber in an exemplary embodiment.

FIG. 8 is a flow chart illustrating a method 800 of exiting gravity chamber 110 using portal chamber 120 in an exemplary embodiment. For method 800, gravity chamber 110 again is rotating about axis 130 to simulate gravitational force within gravity chamber 110 (step 802). It is assumed that a crew member is in gravity chamber 110, and wants to exit gravity chamber 110 into the interior of HAB 100. Portal chamber 120 is also rotating about axis 130 adjacent to gravity chamber 110 (step 804). Portal chamber 120 is able to rotate at the same speed as gravity chamber 110 because engagement mechanism 414 (see FIG. 4) engages or otherwise makes contact with gravity chamber 110. Lock mechanism 418 may also interlock with gravity chamber 110 to ensure that portal chamber 120 is securely coupled to gravity chamber 110. With portal chamber 120 rotating at the same speed as gravity chamber 110, crew member 602 is allowed to pass from gravity chamber 110 to portal chamber 120 (step 806). The door 309 of access opening 307 (see FIG. 3) may be locked until it is directly adjacent to access opening 407 of gravity chamber 110. The door 309 of access opening 307 may also be locked until lock mechanism 418 is engaged so that crew member 602 can safely pass from gravity chamber 110 to portal chamber 120.

Figure 9:
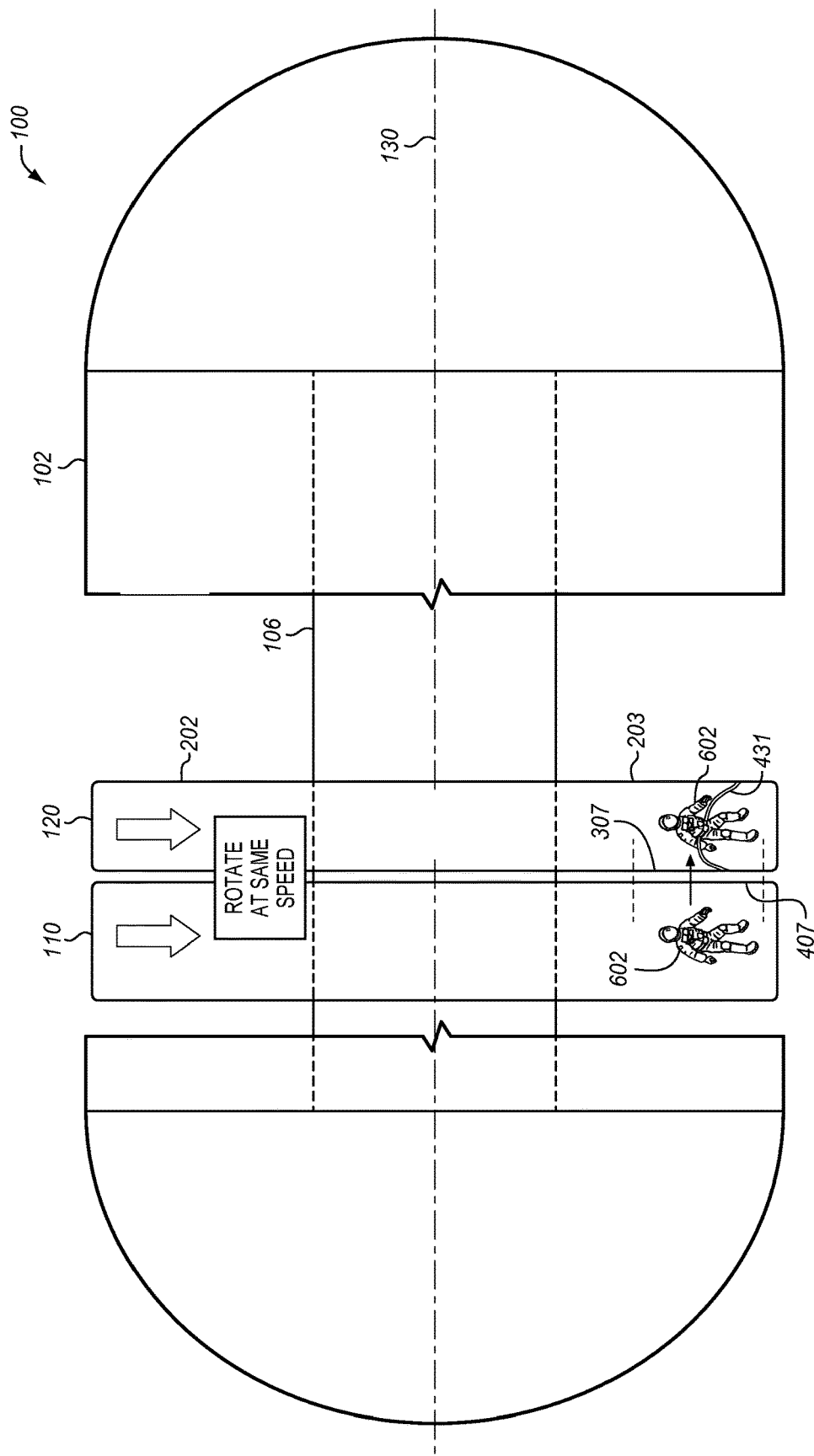
FIGS. 9-10 illustrate a crew member exiting a gravity chamber in an exemplary embodiment.
Figure 10:
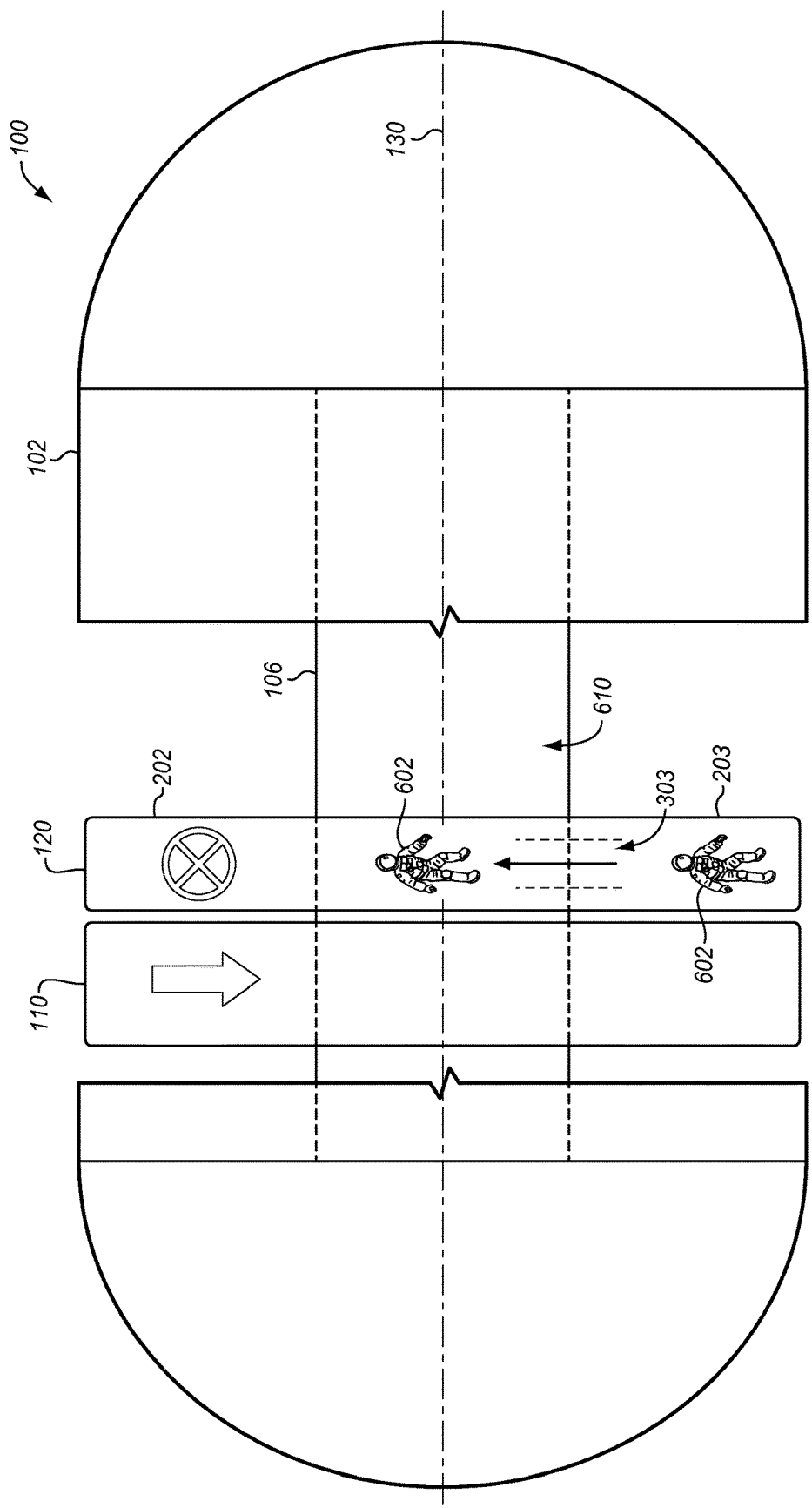

FIGS. 9-10 illustrate a crew member exiting gravity chamber 110 in an exemplary embodiment. FIG. 9 shows crew member 602 passing from gravity chamber 110 to portal chamber 120. When portal chamber 120 is interlocked with gravity chamber 110, access opening 307 of portal chamber 120 is adjacent to access opening 407 of gravity chamber 110 so that crew member 602 may pass through access opening 407 of gravity chamber 110 and access opening 307 of portal chamber 120 to enter the interior of compartment 203. Crew member 602 may secure themselves with safety harness 431.

With crew member 602 properly secured in portal chamber 120, portal chamber 120 is disengaged from gravity chamber 110 (step 808). For example, lock mechanism 418 may decouple from gravity chamber 110, and engagement mechanism 414 may disengage from gravity chamber 110 so that portal chamber 120 is mechanically decoupled from gravity chamber 110. The rotation of portal chamber 120 is then stopped (step 810), such as with brake mechanism 410. The process of disengaging and stopping rotation of portal chamber 120 may be gradual so that crew member 602 is not subjected to a jarring movement. For example, engagement mechanism 414 may gradually reduce the pressure with a friction pad against the surface of gravity chamber 110 to gradually reduce the rotational speed of portal chamber 120. Brake mechanism 410 may also gradually engage to slow and stop the rotation of portal chamber 120. While portal chamber 120 is stopped, crew member 602 is allowed to exit portal chamber 120 (step 812). For example, the door 305 (see FIG. 3) for access opening 303 may be locked, and then unlocked when portal chamber 120 is stopped. Thus, crew member 602 is able to open door 305 and exit portal chamber 120.

When portal chamber 120 is stopped in FIG. 10, crew member 602 is allowed to pass from the interior of compartment 203 within portal chamber 120, through access opening 303, and into the interior 610 of HAB 100 (see also FIG. 4). Portal chamber 120 advantageously allows crew member 602 to exit gravity chamber 110 without having to stop the rotation of gravity chamber 110. Therefore, other occupants in gravity chamber 110 are not bothered when a crew member has to exit gravity chamber 110.

Figure 11:
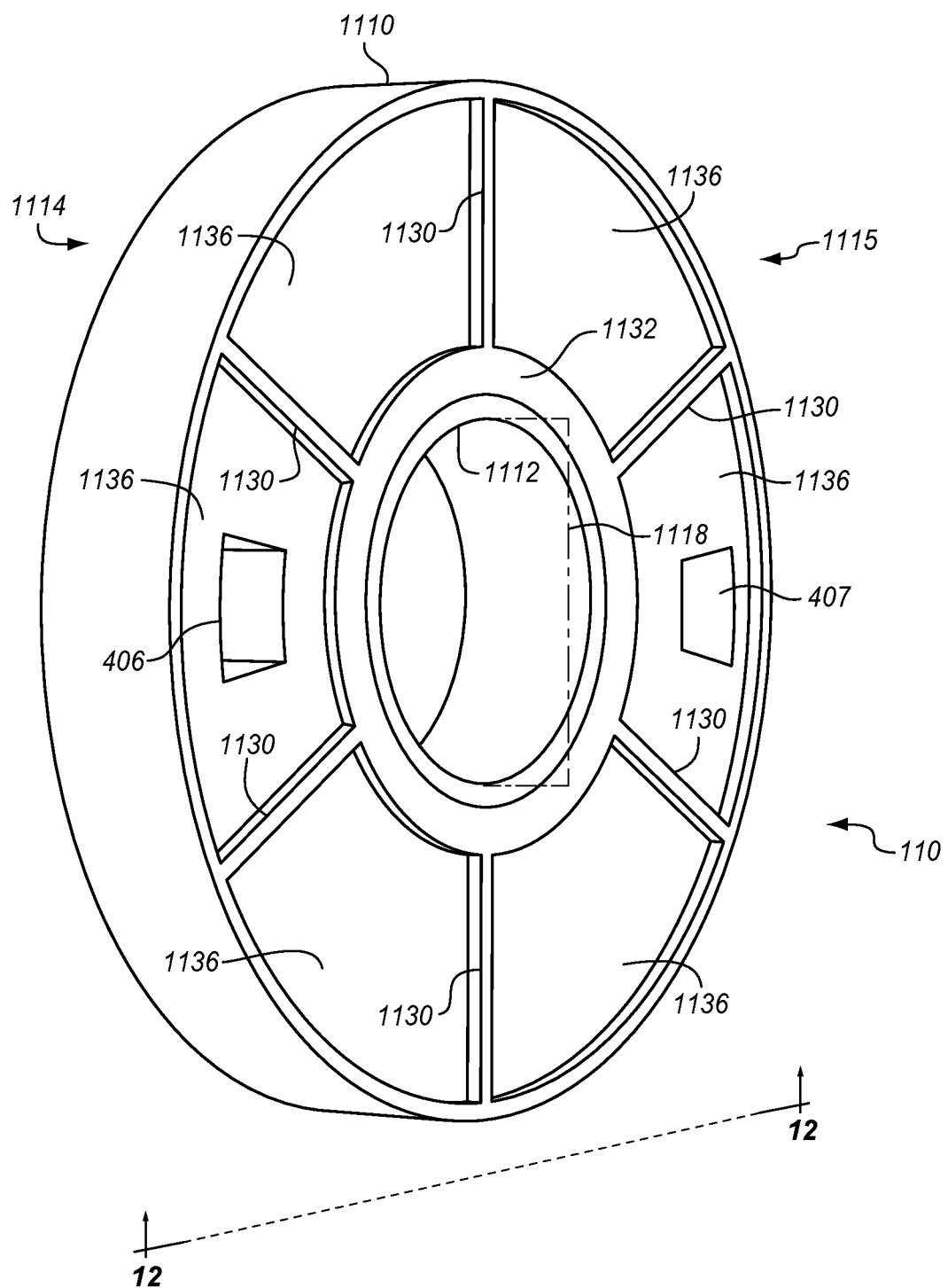
FIG. 11 illustrates a gravity chamber of a habitation module in an exemplary embodiment.

FIG. 11 illustrates gravity chamber 110 in an exemplary embodiment. Gravity chamber 110 is annular or ring-shaped, and includes an outer cylindrical wall 1110, an inner cylindrical structure 1112, and opposing side walls 1114-1115. Outer cylindrical wall 1110 is the outermost cylindrical surface of gravity chamber 110. Outer cylindrical wall 1110 may be made from a thin metal, a composite material, a plastic, or another type of rigid material. Inner cylindrical structure 1112 may comprise a cylindrical wall made from a material, such as a thin metal, a composite material, a plastic, or another type of rigid material. Inner cylindrical structure 1112 may additionally or alternatively comprise a frame with surfaces, ribs, support members, etc., for attaching gravity chamber 110 to HAB 100 (i.e., to hull 102 or cylindrical core member 106). Due to its cylindrical shape, inner cylindrical structure 1112 has an axial hole 1118 through its center that may fit over hull 102 or cylindrical core member 106 of HAB 100.

Side walls 1114-1115 extend between outer cylindrical wall 1110 and inner cylindrical structure 1112. Side walls 1114-1115 may each include a rigid section 1132 and support members 1130 that provide a rigid frame. Rigid section 1132 may be made from a thin metal, a composite material, a plastic, or another type of material, and support members 1130 may be made from aluminum, a composite material, or another type of material. For example, support members 1130 may comprise 1 inch aluminum tubes with 0.049 inch walls. The number and placement of support members 1130 is just an example, and may vary as desired. Side walls 1114-1115 may also include side closures 1136 that enclose the area between support members 1130. Side closures 1136 may be made from a soft material, such as Kevlar®, canvas, or another type of fabric. Access openings 406-407 may be formed in side closures 1136 to allow crew members to access the inside of gravity chamber 110.

Figure 12:
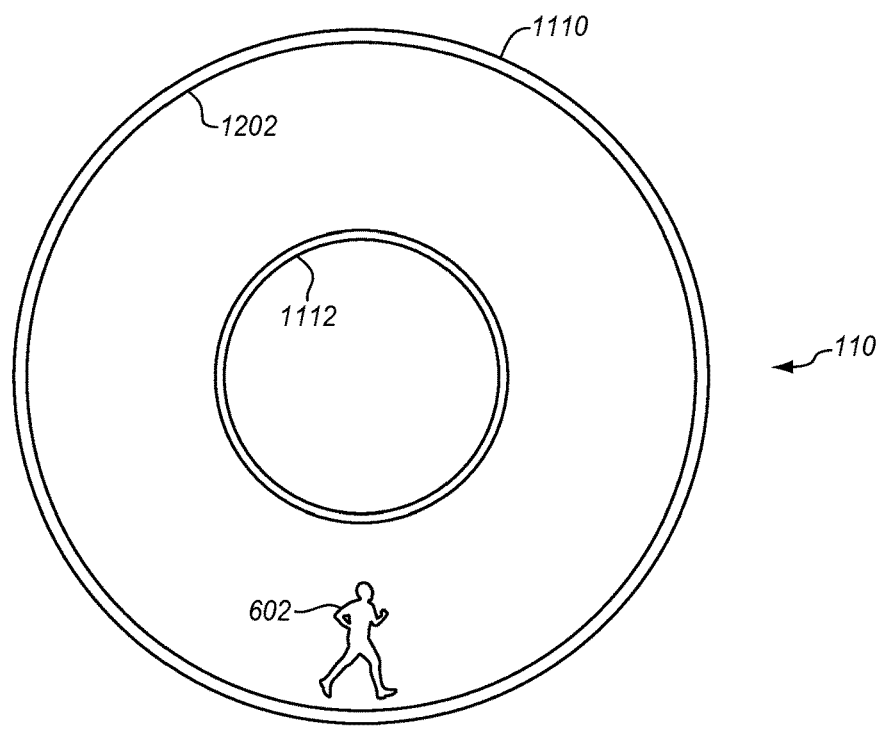
FIG. 12 illustrates an interior of a gravity chamber in an exemplary embodiment.

FIG. 12 illustrates an interior of gravity chamber 110 in an exemplary embodiment. FIG. 12 is a cross-section along line 12-12 of FIG. 11. In this embodiment, gravity chamber 110 is used for exercise activities, and therefore, may be referred to as an exercise chamber. Its interior is hollow or empty between inner cylindrical structure 1112 and outer cylindrical wall 1110 so that crew member 602 is able to walk, jog, or run within gravity chamber 110. An inner surface 1202 of outer cylindrical wall 1110 may be lined with a synthetic rubber material or similar type of material for an exercise track. Thus, crew member 602 walks, jogs, or runs on inner surface 1202 as gravity chamber 110 rotates to create an artificial gravity environment.

Figure 13:
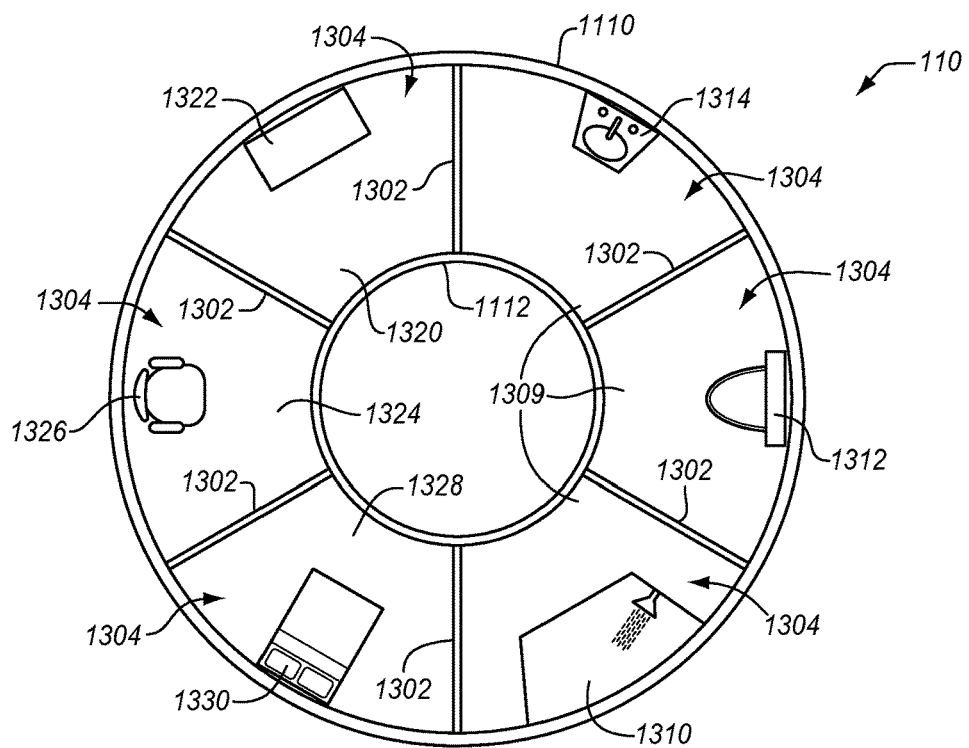
FIG. 13 illustrates an interior of a gravity chamber in an exemplary embodiment.

FIG. 13 illustrates an interior of gravity chamber 110 in an exemplary embodiment. FIG. 13 is also a cross-section along line 12-12 of FIG. 11. In this embodiment, gravity chamber 110 is compartmentalized into individual rooms. As the rooms of gravity chamber 110 may be used for rest and other activities, gravity chamber 110 may be referred to as a Rest and Activities (RAC) chamber in this embodiment. Gravity chamber 110 includes a plurality of partitions 1302 that extend radially from inner cylindrical structure 1112 to outer cylindrical wall 1110 to define the compartments 1304 within gravity chamber 110. Partitions 1302 may extend fully from inner cylindrical structure 1112 to outer cylindrical wall 1110 to completely enclose compartments 1304 for privacy. Compartments 1304 may be used for a variety of purposes, such as restroom facilities 1309 having a shower 1310, a toilet 1312, and a sink 1314. A compartment 1304 may be used for office facilities 1320 having a desk 1322, chairs, cabinets, etc. A compartment 1304 may be used for lounge facilities 1324 having chairs 1326, a couch, etc. A compartment 1304 may also be used for sleeping facilities 1328 having a bed 1330.

Figure 14:
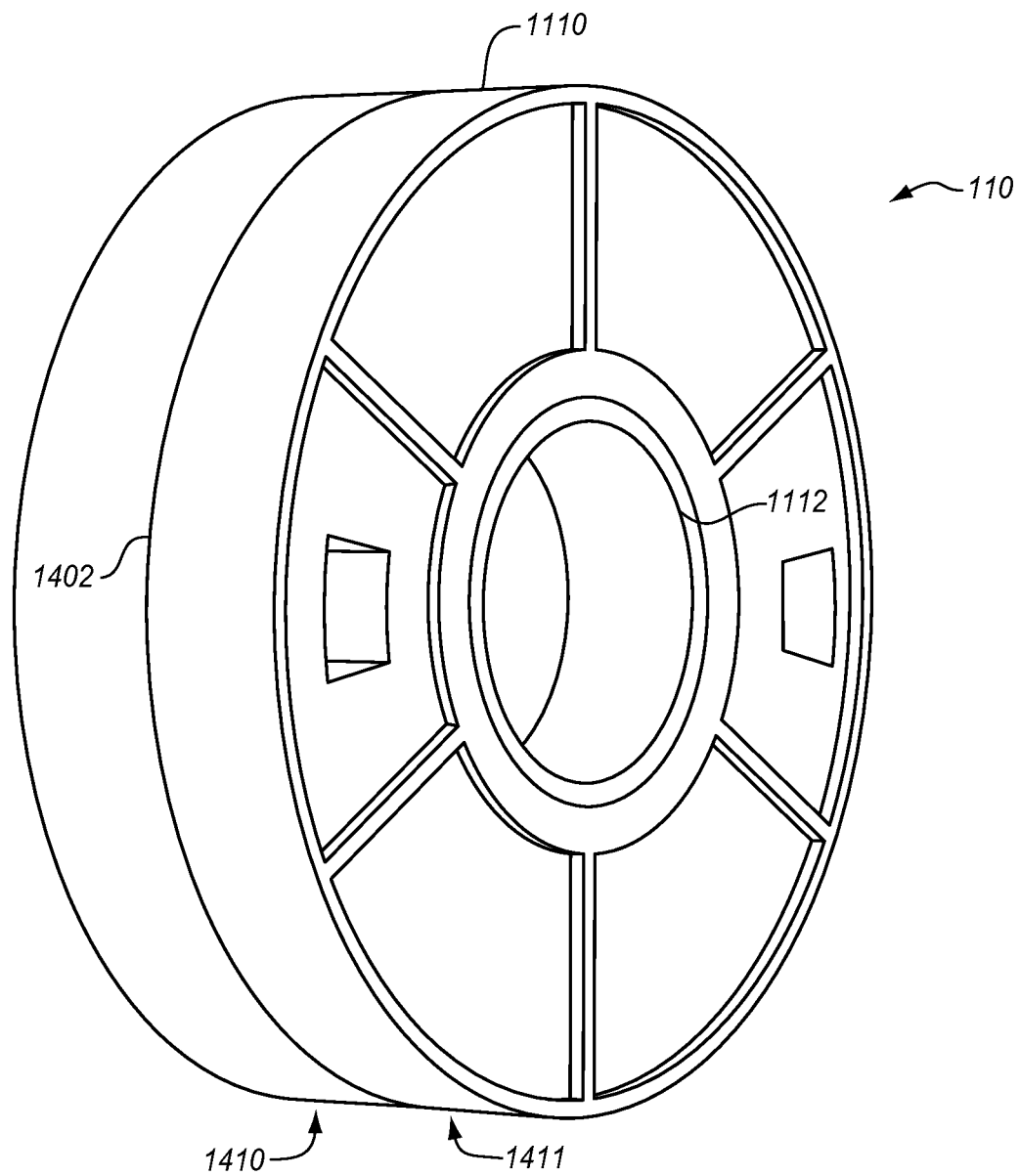
FIG. 14 illustrates a gravity chamber split into two or more annular sub-chambers in an exemplary embodiment.

FIG. 14 illustrates gravity chamber 110 split into two or more annular sub-chambers in an exemplary embodiment. In FIG. 14, gravity chamber 110 includes a divider 1402 that is orthogonal to axis 130, and divides gravity chamber 110 into annular sub-chambers 1410-1411. Sub-chamber 1410 is an exercise chamber such as shown in FIG. 12, and therefore, is hollow between inner cylindrical structure 1112 and outer cylindrical wall 1110. Sub-chamber 1411 is a RAC chamber, and includes a plurality of partitions that extend radially from inner cylindrical structure 1112 to outer cylindrical wall 1110 to define compartments within sub-chamber 1411, such as shown in FIG. 13. Crew members are able to pass through divider 1402, such as through access openings, so that they can move freely between the RAC chamber and the exercise chamber.

Figure 15A:
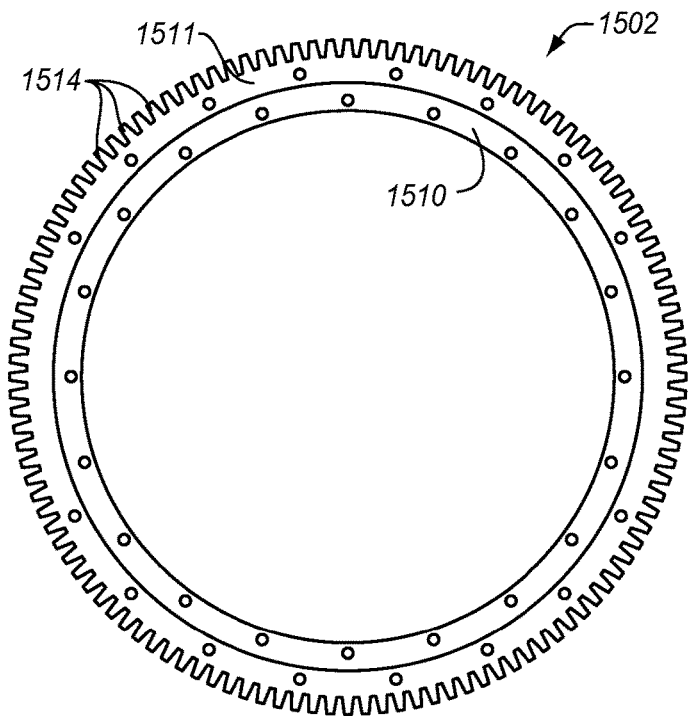
FIGS. 15A-B illustrate support bearings for a gravity chamber and/or a portal chamber in an exemplary embodiment.
Figure 15B:
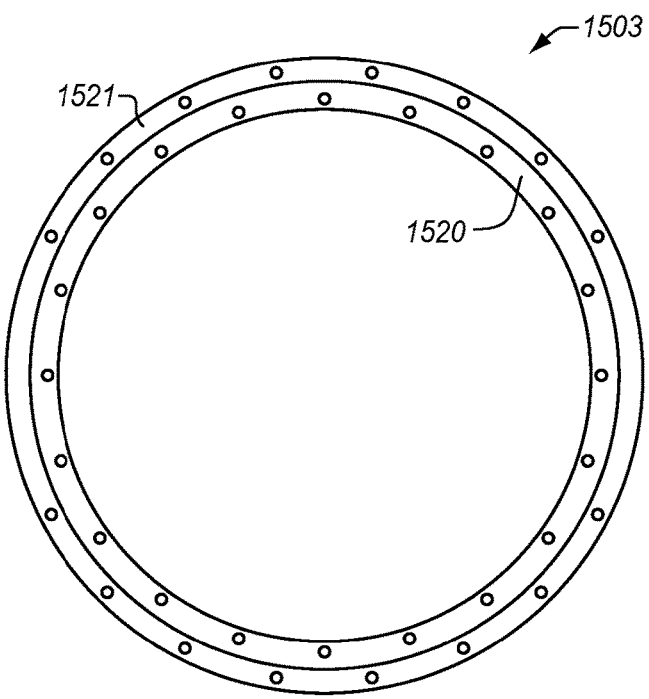

In the embodiments described herein, gravity chamber 110 and portal chamber 120 may attach to HAB 100 in any manner that allows gravity chamber 110 and portal chamber 120 to rotate about the same axis. For example, gravity chamber 110 and portal chamber 120 may attach to cylindrical core member 106 of HAB 100 with some type of attachment members that allow chambers 110 and 120 to rotate about axis 130. One example of attachment members comprises support bearings as shown in FIGS. 15A-B. FIGS. 15A-B illustrate support bearings 1502-1503 for gravity chamber 110 and/or portal chamber 120 in an exemplary embodiment. Support bearings 1502-1503 are configured to attach gravity chamber 110 or portal chamber 120 to cylindrical core member 106 so that they are able to rotate in relation to cylindrical core member 106 about axis 130. Support bearing 1502 includes an inner race (or ring) 1510, an outer race (or ring) 1511, and a rolling element between inner race 1510 and outer race 1511 that enables rotational movement (not visible in FIG. 15A). The rolling element may comprise ball bearings, cylindrical rollers, or the like. Inner race 1510 is configured to attach to cylindrical core member 106, while outer race 1511 is configured to attach to gravity chamber 110 or portal chamber 120. Support bearing 1502 also includes a plurality of teeth 1514 on outer race 1511 for meshing with a drive gear of a drive mechanism. Support bearing 1503 (see FIG. 15B) has a similar structure as support bearing 1502 with an inner race 1520 and an outer race 1521, except that its outer race 1521 does not include teeth.

Figure 16:
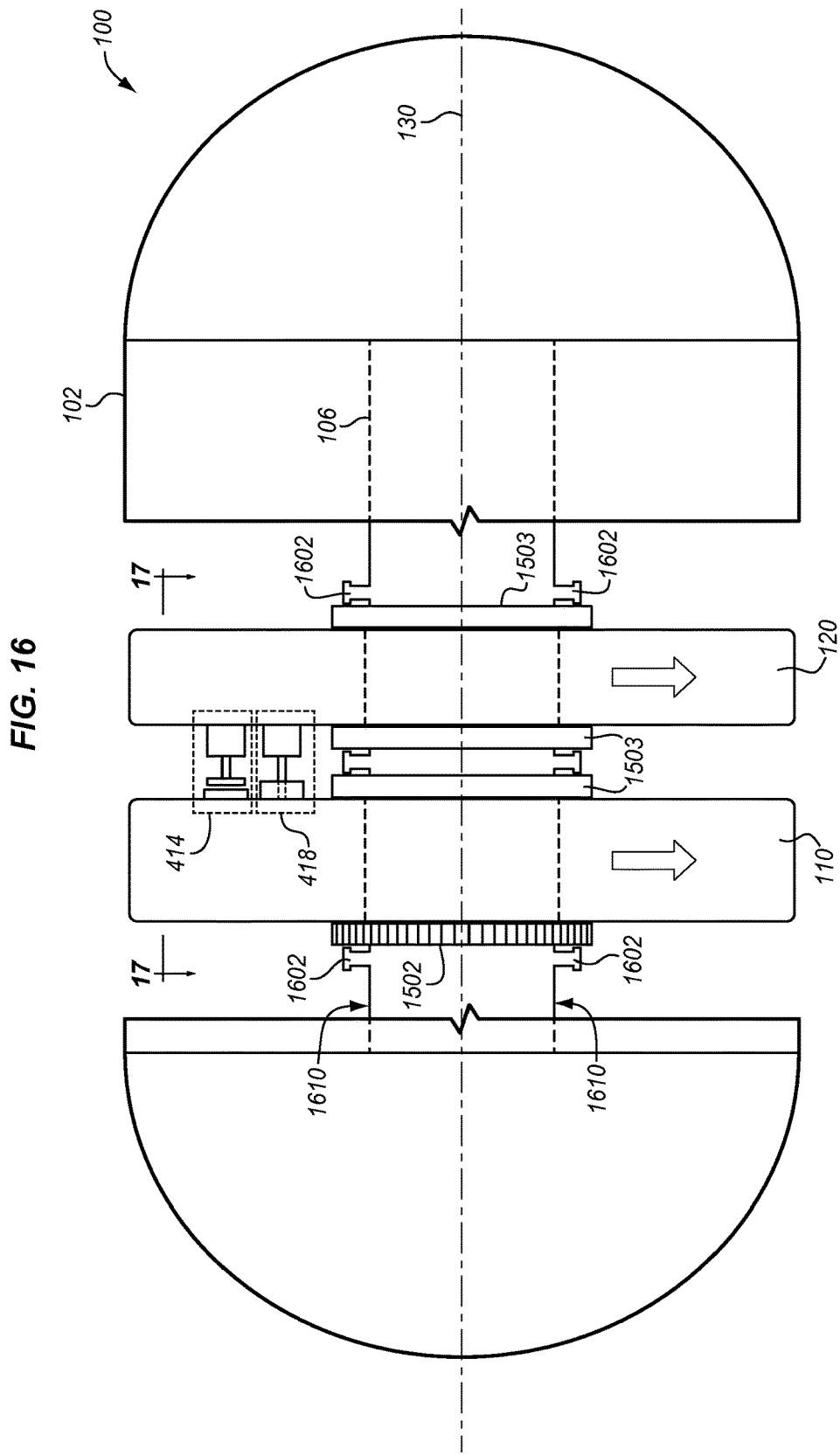
FIG. 16 illustrates support bearings installed on a cylindrical core member of a habitation module in an exemplary embodiment.

FIG. 16 illustrates support bearings 1502-1503 installed on cylindrical core member 106 in an exemplary embodiment. In this embodiment, gravity chamber 110 and portal chamber 120 attach to cylindrical core member 106 with a pair of support bearings 1502-1503. Support bearings 1502-1503 are spaced axially along and attach to cylindrical core member 106. The use and placement of support bearings 1502-1503 for gravity chamber 110 as shown in FIG. 16 is just an example and may vary as desired.

Cylindrical core member 106 includes mounting members 1602 that protrude from an outer surface 1610 of cylindrical core member 106. Mounting members 1602 may comprise a ring that encircles cylindrical core member 106, or may comprise a plurality of individual members that are affixed around the circumference of outer surface 1610. Support bearings 1502-1503 attach to mounting members 1602, and also attach to gravity chamber 110 or portal chamber 120.

Also shown in FIG. 16 is an example of engagement mechanism 414 and lock mechanism 418. More detailed views of engagement mechanism 414 and lock mechanism 418 are shown in FIG. 17. FIG. 17 illustrates attachment of gravity chamber 110 and portal chamber 120 to cylindrical core member 106 in an exemplary embodiment. FIG. 17 is a cross-section along line 17-17 of FIG. 16 showing attachment points. On the left-hand side of gravity chamber 110, outer race 1511 of a support bearing 1502 attaches to gravity chamber 110 with an attachment member 1702, such as a bolt, screw, pin, etc. Outer race 1511 may attach to inner cylindrical structure 1112 or a side wall 1114-1115 of gravity chamber 110. Inner race 1510 of support bearing 1502 attaches to mounting member 1602 with an attachment member 1702. Bushings 1704 (e.g., rubber bushings) may be used at the attachment point for outer race 1511 and inner race 1510 to absorb noise and/or vibration at the attachment point. Also shown in FIG. 17 is a rolling element 1710 between inner race 1510 and outer race 1511 that enables rotational movement. Rolling element 1710 may comprise ball bearings, cylindrical rollers, or the like. A drive mechanism 1720 is placed proximate or adjacent to outer race 1511 of support bearing 1502 to directly drive support bearing 1502. Drive mechanism 1720 is configured to spin a drive gear 1722 to impart rotational movement to outer race 1511. Teeth 1724 on drive gear 1722 mesh with teeth 1514 on outer race 1511 (see FIG. 15A). When drive mechanism 1720 turns drive gear 1722, it imparts rotational movement on gravity chamber 110 about axis 130 (see FIG. 1). Drive mechanism 1720 may comprise an electric motor, a hydraulic motor, a pneumatic motor, or any other actuating device that has a variable rotational speed.

On the right-hand side of gravity chamber 110, outer race 1521 of a support bearing 1503 attaches to gravity chamber 110 with an attachment member 1702. Inner race 1520 of support bearing 1503 attaches to mounting member 1602 with an attachment member 1702. Bushings 1704 (e.g., rubber bushings) may be used at the attachment point for outer race 1521 and inner race 1520 to absorb noise and/or vibration at the attachment point. Also shown in FIG. 17 is a rolling element 1710 between inner race 1520 and outer race 1521 that enables rotational movement.

On the left-hand side of portal chamber 120, outer race 1521 of a support bearing 1503 attaches to portal chamber 120 with an attachment member 1702. Outer race 1521 may attach to inner cylindrical structure 212 or a side wall 214-215, 224-225 of portal chamber 120. Inner race 1520 of support bearing 1503 attaches to mounting member 1602 with an attachment member 1702. Bushings 1704 (e.g., rubber bushings) may be used at the attachment point for outer race 1521 and inner race 1520 to absorb noise and/or vibration at the attachment point. Also shown in FIG. 17 is a rolling element 1710 between inner race 1520 and outer race 1521 that enables rotational movement.

On the right-hand side of portal chamber 120, outer race 1521 of a support bearing 1503 attaches to portal chamber 120 with an attachment member 1702. Inner race 1520 of support bearing 1503 attaches to mounting member 1602 with an attachment member 1702. Bushings 1704 (e.g., rubber bushings) may be used at the attachment point for outer race 1511 and inner race 1510 to absorb noise and/or vibration at the attachment point. Also shown in FIG. 17 is a rolling element 1710 between inner race 1520 and outer race 1521 that enables rotational movement.

FIG. 17 also shows an example of an engagement mechanism 414 of portal chamber 120. Engagement mechanism 414 includes an actuator device 1730 that is able to extend and retract a friction pad 1732. Actuator device 1730 may apply pressure with friction pad 1732 to a surface 1736 of gravity chamber 110 to engage gravity chamber 110. Actuator device 1730 may also reduce the pressure with friction pad 1732 to the surface 1736 of gravity chamber 110 to disengage from gravity chamber 110. Actuator device 1730 may gradually increase the pressure with friction pad 1732 to the surface 1736 of gravity chamber 110 to gradually accelerate rotation of portal chamber 120 to the speed of gravity chamber 110. Thus, portal chamber 120 will not have an extreme jolting action when engaging with gravity chamber 110. Also, actuator device 1730 may gradually decrease the pressure with friction pad 1732 to the surface 1736 of gravity chamber 110 to gradually decelerate rotation of portal chamber 120.

FIG. 17 also shows an example of lock mechanism 418 of portal chamber 120. Lock mechanism 418 includes an actuator device 1740 that is able to extend and retract a pin 1742. When extended, pin 1742 catches or presses into a corresponding hole 1746 in a structure 1744 of gravity chamber 110. Thus, portal chamber 120 is securely coupled to gravity chamber 110 when pin 1742 is pressed into hole 1746.

FIG. 17 also shows an example of a brake mechanism 410 of portal chamber 120. Brake mechanism 410 includes one or more actuator devices 1750 that are able to extend and retract a friction pad 1752. Actuator device 1750 may apply pressure with friction pad 1752 to a stationary surface, such as a surface of mounting member 1602, to apply the brake and stop rotation of portal chamber 120. Actuator device 1750 may also reduce the pressure with friction pad 1752 to release the brake.

Figure 18A:
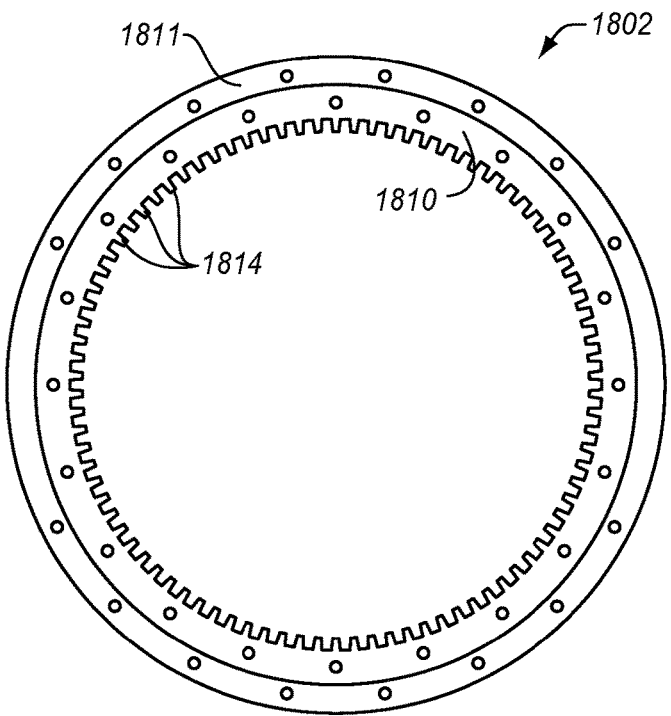
FIGS. 18A-B illustrate support bearings for a gravity chamber and/or a portal chamber in an exemplary embodiment.
Figure 18B:
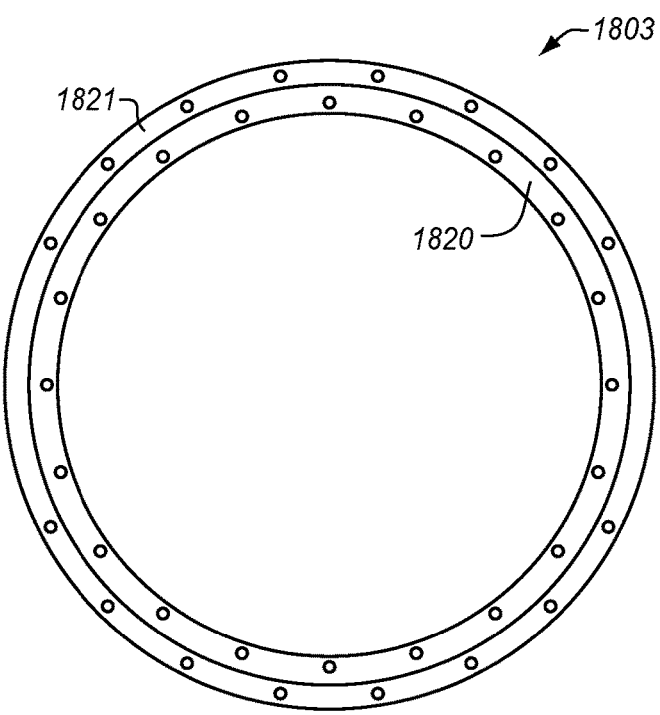

In the embodiments described above, gravity chamber 110 and portal chamber 120 were attached to cylindrical core member 106 of HAB 100. However, gravity chamber 110 and portal chamber 120 may attach to different points of HAB 100 to rotate about axis 130. In another embodiment, gravity chamber 110 and portal chamber 120 may attached to an inner surface of hull 102, which is illustrated in FIGS. 18A, 18B, 19, and 20. FIGS. 18A-B illustrate support bearings 1802-1803 for gravity chamber 110 in an exemplary embodiment. Support bearings 1802-1803 are configured to attach gravity chamber 110 to hull 102 so that gravity chamber 110 is able to rotate in relation to hull 102 about axis 130. Support bearing 1802 includes an inner race (or ring) 1810, an outer race (or ring) 1811, and a rolling element between inner race 1810 and outer race 1811 that enables rotational movement (not visible in FIG. 18A). The rolling element may comprise ball bearings, cylindrical rollers, or the like. Outer race 1811 is configured to attach to hull 102, while inner race 1810 is configured to attach to gravity chamber 110. Support bearing 1802 also includes a plurality of teeth 1814 on inner race 1810 for meshing with a drive gear of a drive mechanism. Support bearing 1803 (see FIG. 18B) has a similar structure as support bearing 1802 with an inner race 1820 and an outer race 1821, except that its inner race 1820 does not include teeth.

Figure 19:
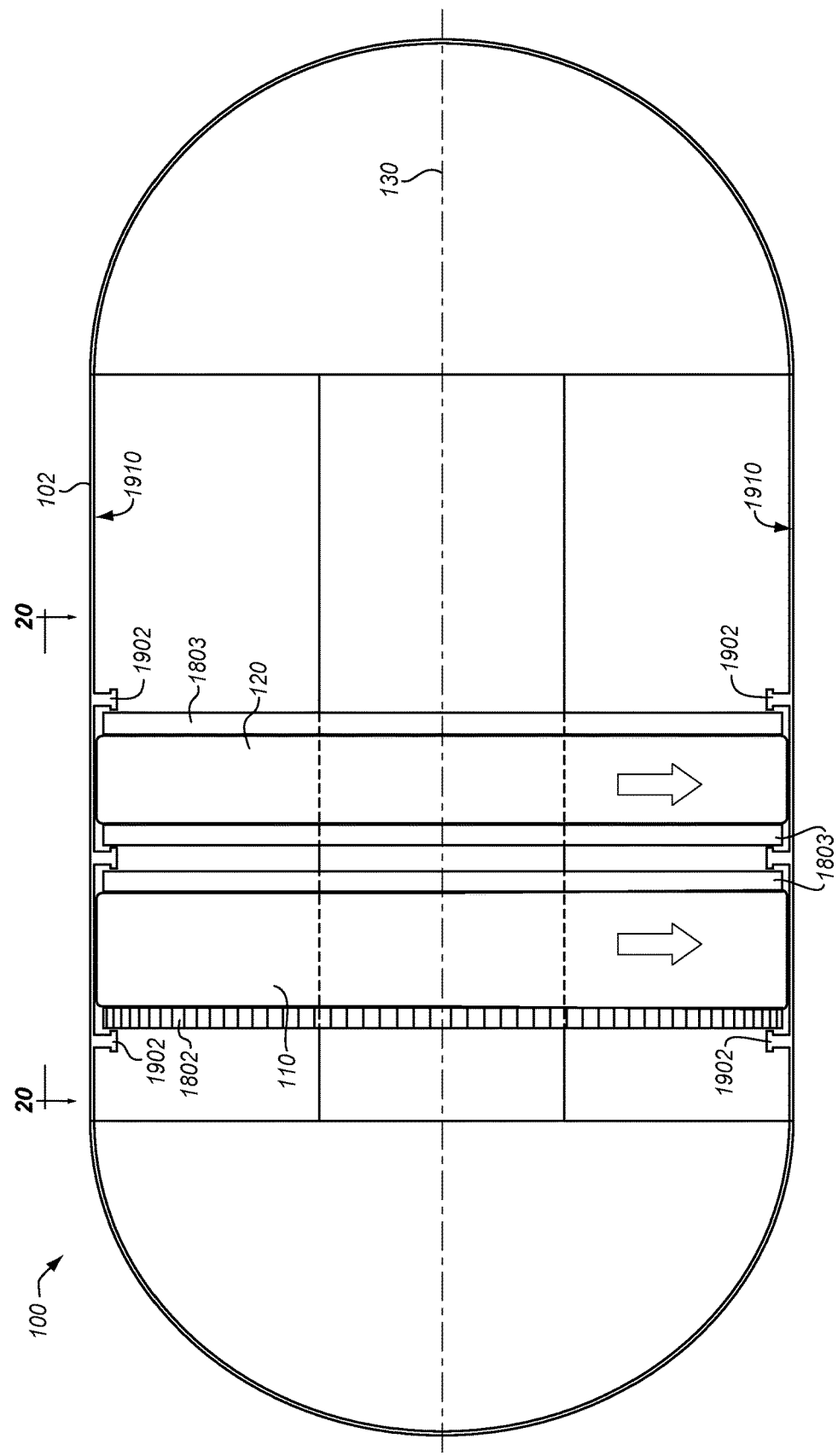
FIG. 19 illustrates a gravity chamber and a portal chamber attached to a hull in an exemplary embodiment.

FIG. 19 illustrates gravity chamber 110 and portal chamber 120 attached to hull 102 in an exemplary embodiment. In this embodiment, gravity chamber 110 and portal chamber 120 attach to an inner surface 1910 of hull. Mounting members 1902 protrude from the inner surface 1910 of hull 102. Mounting members 1902 may comprise a ring that extends around the inner surface 1910 of hull 102, or may comprise a plurality of individual members that are affixed around the inner surface 1910 of hull 102. Support bearings 1802-1803 attach to mounting members 1902, and also attach to gravity chamber 110 or portal chamber 120.

Figure 20:
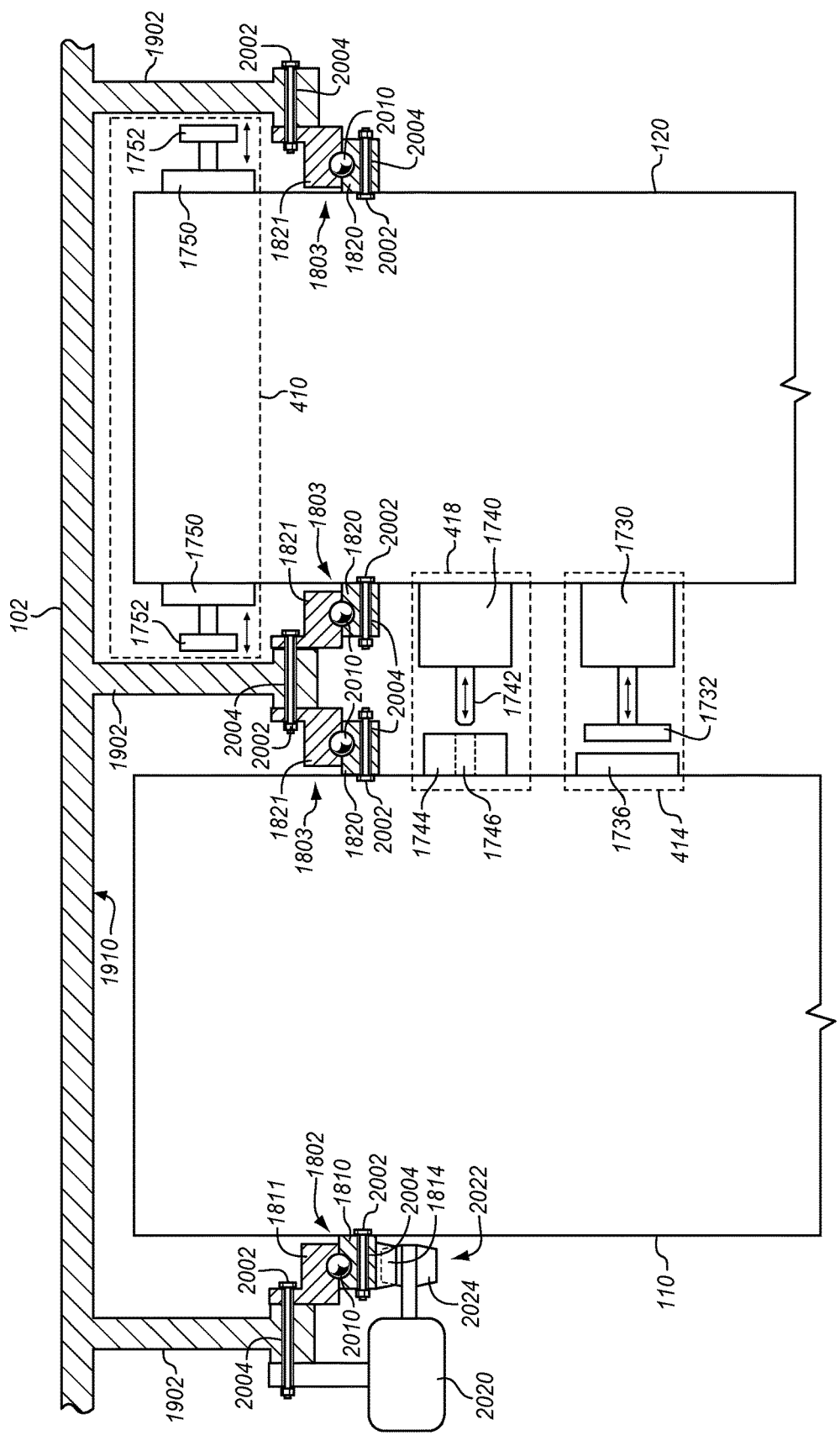
FIG. 20 illustrates attachment of a gravity chamber and a portal chamber to a hull in an exemplary embodiment.

FIG. 20 illustrates attachment of gravity chamber 110 and portal chamber 120 to hull 102 in an exemplary embodiment. FIG. 20 is a cross-section along line 20-20 of FIG. 19 showing attachment points. On the left-hand side of gravity chamber 110, inner race 1810 of a support bearing 1802 attaches to gravity chamber 110 with an attachment member 2002, such as a bolt, screw, pin, etc. Inner race 1810 may attach to inner cylindrical structure 1112 or a side wall 1114-1115 of gravity chamber 110. Outer race 1811 of support bearing 1802 attaches to mounting member 1902 with an attachment member 2002. Bushings 2004 (e.g., rubber bushings) may be used at the attachment point for outer race 1811 and inner race 1810 to absorb noise and/or vibration at the attachment point. Also shown in FIG. 20 is a rolling element 2010 between inner race 1810 and outer race 1811 that enables rotational movement. Rolling element 2010 may comprise ball bearings, cylindrical rollers, or the like. A drive mechanism 2020 is placed proximate or adjacent to inner race 1810 of support bearing 1802 to directly drive support bearing 1802. Drive mechanism 2020 is configured to spin a drive gear 2022 to impart rotational movement to inner race 1810. Teeth 2024 on drive gear 2022 mesh with teeth 1814 on inner race 1810 (see FIG. 18A). When drive mechanism 2020 turns drive gear 2022, it imparts rotational movement on gravity chamber 110 about axis 130 (see FIG. 1). Drive mechanism 2020 may comprise an electric motor, a hydraulic motor, a pneumatic motor, or any other actuating device that has a variable rotational speed.

On the right-hand side of gravity chamber 110, inner race 1820 of a support bearing 1803 attaches to gravity chamber 110 with an attachment member 2002. Outer race 1821 of support bearing 1803 attaches to mounting member 1902 with an attachment member 2002. Bushings 2004 (e.g., rubber bushings) may be used at the attachment point for outer race 1821 and inner race 1820 to absorb noise and/or vibration at the attachment point.

On the left-hand side of portal chamber 120, inner race 1820 of a support bearing 1803 attaches to portal chamber 120 with an attachment member 2002. Inner race 1820 may attach to inner cylindrical structure 212 or a side wall 214-215, 224-225 of portal chamber 120. Outer race 1821 of support bearing 1803 attaches to mounting member 1902 with an attachment member 2002. Bushings 2004 (e.g., rubber bushings) may be used at the attachment point for outer race 1821 and inner race 1820 to absorb noise and/or vibration at the attachment point.

On the right-hand side of portal chamber 120, inner race 1820 of a support bearing 1803 attaches to portal chamber 120 with an attachment member 2002. Outer race 1821 of support bearing 1803 attaches to mounting member 1902 with an attachment member 2002. Bushings 2004 (e.g., rubber bushings) may be used at the attachment point for outer race 1811 and inner race 1810 to absorb noise and/or vibration at the attachment point.

FIG. 20 also shows an example of an engagement mechanism 414, lock mechanism 418, and a brake mechanism 410 similar to FIG. 17.

Figure 21:
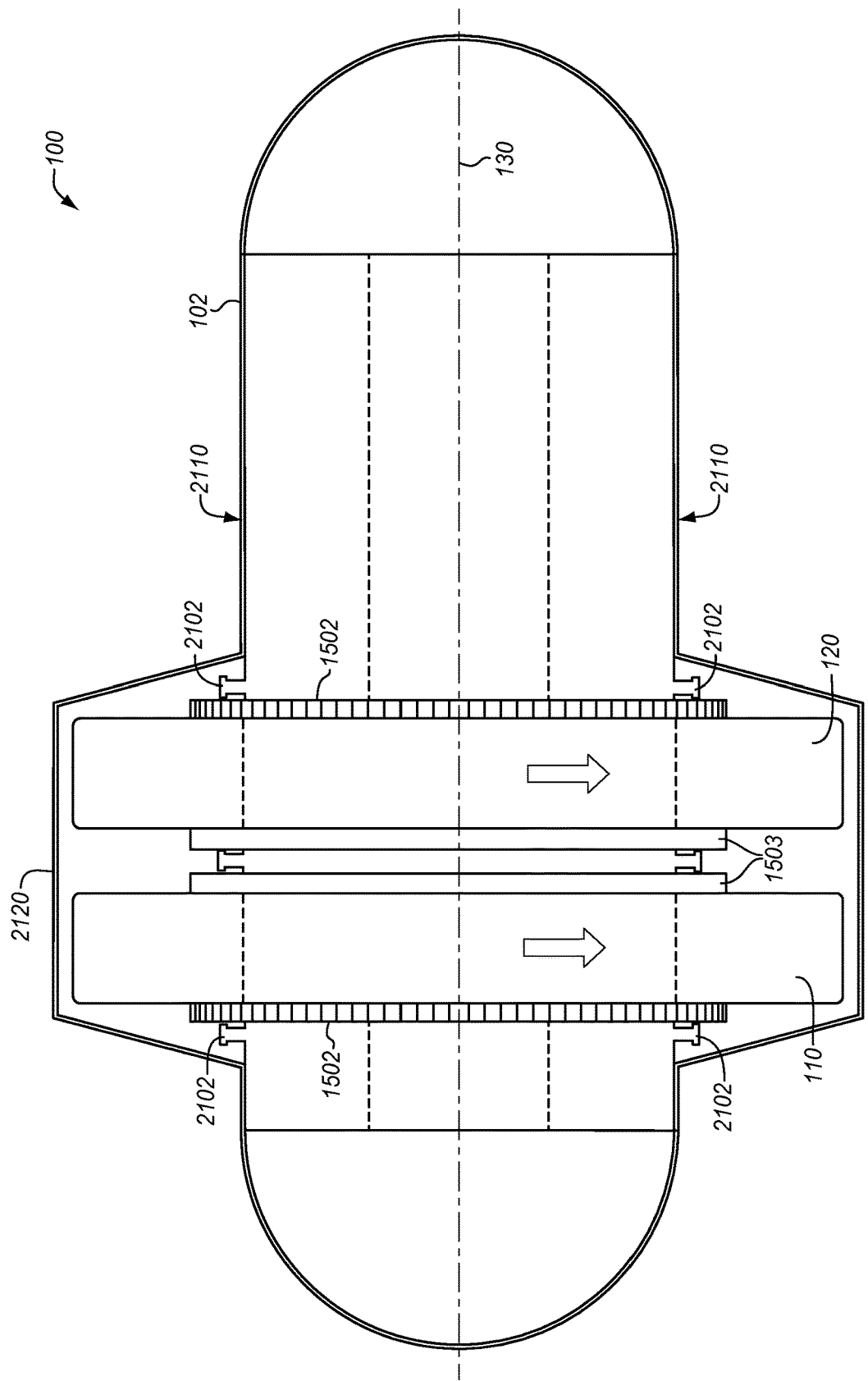
FIG. 21 illustrates a gravity chamber and a portal chamber attached to a hull in another exemplary embodiment.

FIG. 21 illustrates gravity chamber 110 and portal chamber 120 attached to hull 102 in another exemplary embodiment. In this embodiment, gravity chamber 110 and portal chamber 120 attach to an outer surface 2110 of hull. Mounting members 2102 protrude from the outer surface 2110 of hull 102. Mounting members 2102 may comprise a ring that extends around the outer surface 2110 of hull 102, or may comprise a plurality of individual members that are affixed around the outer surface 2110 of hull 102. Support bearings 1502-1503 as shown in FIGS. 15A-15B may be used to attach gravity chamber 110 or portal chamber 120 to mounting members 2102.

Gravity chamber 110 and portal chamber 120 are encompassed or enclosed by a canopy or shell 2120. Shell 2120 may be made from a rigid material, such as a composite, metal, etc. Shell 2120 is sealed around a circumference of hull 102 (as shown in FIG. 1) on opposing sides of gravity chamber 110 and portal chamber 120 to encompass gravity chamber 110 and portal chamber 120 in an airtight cavity. The interior of shell 2120 may be pressurized much like the interior of hull 102. The outer dimension of shell 2120 is larger than the outer diameter of hull 102. Therefore, the fairing of a launch vehicle may need to be altered in order to transport HAB 100 into space.

In the above embodiments, gravity chamber 110 and portal chamber 120 are shown as being attached to the same portion of HAB 100. For example, FIG. 16 shows both gravity chamber 110 and portal chamber 120 attached to cylindrical core member 106, FIG. 19 shows both gravity chamber 110 and portal chamber 120 attached to the inner surface 1910 of hull 102, and FIG. 21 shows both gravity chamber 110 and portal chamber 120 attached to the outer surface 2110 of hull 102. However, gravity chamber 110 and portal chamber 120 may have different attachment points to HAB 100. For example, gravity chamber 110 may be attached to cylindrical core member 106 while portal chamber 120 is attached to the inner surface 1910 of hull 102. In another example, gravity chamber 110 may be attached to the inner surface 1910 of hull 102 while portal chamber 120 is attached to the cylindrical core member 106.

Figure 22:
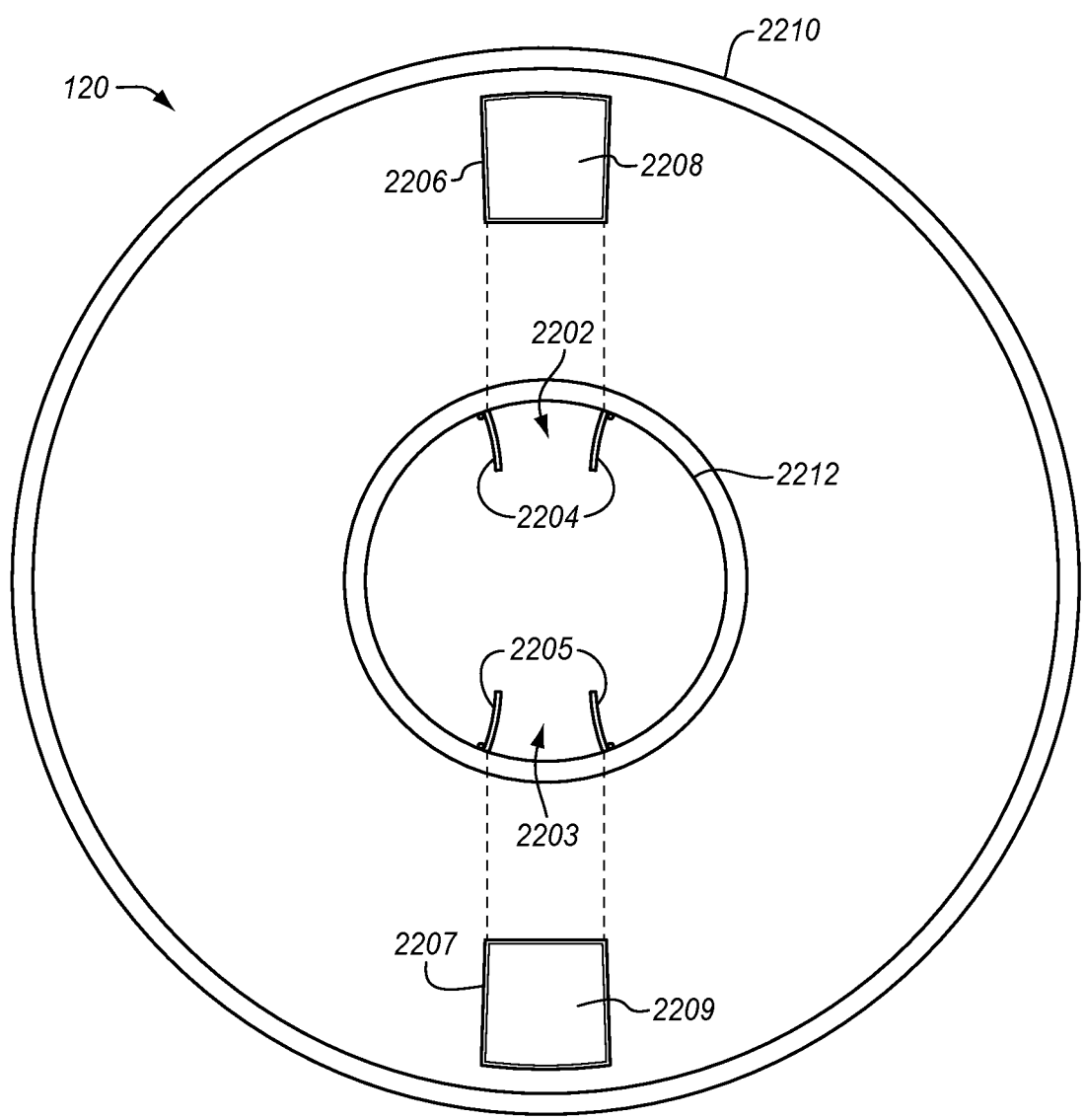
FIG. 22 illustrates a portal chamber as an exercise chamber in an exemplary embodiment.

As stated above, portal chamber 120 may have a variety of structures. In another embodiment, portal chamber 120 may have a structure similar to an exercise chamber as shown in FIG. 12. FIG. 22 illustrates portal chamber 120 as an exercise chamber in an exemplary embodiment. In this example, portal chamber 120 includes an outer cylindrical wall 2210 and inner cylindrical structure 2212. Portal chamber 120 is largely hollow between outer cylindrical wall 2210 and inner cylindrical structure 2212 for an exercise track (see also, FIG. 12). Portal chamber 120 includes access openings 2202-2203, where a crew member is able to pass between an interior of HAB 100 and portal chamber 120. Portal chamber 120 may include access doors 2204-2205 that open and close to control the pathway through access openings 2202-2203. Portal chamber 120 also includes access openings 2206-2207 that allow crew members to pass between portal chamber 120 and an access opening of gravity chamber 110. Access openings 2206-2207 have a size large enough for a crew member to pass through, and may include a door 2208-2209 and a mechanism for opening and closing the door, such as a latch, a zipper, etc.

In this embodiment, the exercise chamber shown in FIG. 22 is used as portal chamber 120, and gravity chamber 110 is used as the RAC chamber. The RAC chamber can remain rotating so that occupants can experience an uninterrupted artificial gravity environment. If a crew member wants to enter the RAC chamber, they would use the exercise chamber as the portal. For instance, rotation of the exercise chamber is stopped so that the crew member may enter the exercise chamber. The exercise chamber then engages the RAC chamber to synchronize rotation of the exercise chamber with the RAC chamber. With the exercise chamber rotating at the same speed as the RAC chamber, the crew member may pass from the exercise chamber to the RAC chamber.

The rotation of gravity chamber 110 and portal chamber 120 may create an unwanted momentum. To cancel out the unwanted momentum, a cylindrical counter-weight member may be installed on HAB 100 (see FIG. 1) that rotates about axis 130 in an opposite direction than gravity chamber 110 and portal chamber 120. The structure and use of the counter-weight member is beyond the scope of this disclosure.

Although specific embodiments were described herein, the scope is not limited to those specific embodiments. Rather, the scope is defined by the following claims and any equivalents thereof.

The invention claimed is:

1. A habitation module, comprising:
   a gravity chamber configured to rotate about an axis to simulate a gravitational force within the gravity chamber; and
   a portal chamber adjacent to the gravity chamber and configured to rotate about the axis;
   the portal chamber includes:
      a brake mechanism configured to stop the rotation of the portal chamber about the axis;
      a first access opening for a crew member to pass between an interior of the habitation module and the portal chamber while rotation of the portal chamber is stopped;
      an engagement mechanism configured to engage the gravity chamber to rotate the portal chamber about the axis at a speed of the gravity chamber, and configured to disengage from the gravity chamber; and
      a second access opening for the crew member to pass between the portal chamber and the gravity chamber while the portal chamber rotates at the speed of the gravity chamber.

2. The habitation module of claim 1 wherein:
   the engagement mechanism includes an actuator device configured to apply pressure with a friction pad to a surface of the gravity chamber to engage the gravity chamber, and configured to reduce the pressure with the friction pad to the surface of the gravity chamber to disengage from the gravity chamber.

3. The habitation module of claim 2 wherein:
   the actuator device of the engagement mechanism is configured to gradually increase the pressure with the friction pad to the surface of the gravity chamber to gradually accelerate rotation of the portal chamber to the speed of the gravity chamber.

4. The habitation module of claim 1 further comprising:
   a lock mechanism configured to secure the portal chamber to the gravity chamber.

5. The habitation module of claim 4 wherein:
   the lock mechanism is positioned on the portal chamber so that the lock mechanism interlocks with the gravity chamber when the second access opening of the portal chamber is directly adjacent to an access opening of the gravity chamber.

6. The habitation module of claim 5 wherein:
   the second access opening of the portal chamber includes a door configured to open only when the lock mechanism is interlocked with the gravity chamber.

7. The habitation module of claim 1 wherein:
   the portal chamber includes an inner cylindrical structure and compartments that extend from the inner cylindrical structure in opposing directions; and
   an interior of the compartments are hollow to form a corridor through which crew members are able to move.

8. The habitation module of claim 1 wherein:
   the gravity chamber is annular and includes:
      a first inner cylindrical structure;
      a first outer cylindrical wall; and
      opposing first side walls that connect the first outer cylindrical wall and the first inner cylindrical structure.

9. The habitation module of claim 8 wherein:
the gravity chamber is hollow between the first inner cylindrical structure, the first outer cylindrical wall, and the first side walls; and
an inner surface of the first outer cylindrical wall is lined with a material for an exercise track.

10. The habitation module of claim 8 wherein:
the gravity chamber includes a plurality of partitions that extend radially from the first inner cylindrical structure to the first outer cylindrical wall between the first side walls to define compartments within the gravity chamber.

11. The habitation module of claim 8 wherein:
the portal chamber is annular and includes:
a second inner cylindrical structure;
a second outer cylindrical wall; and
opposing second side walls that connect the second outer cylindrical wall and the second inner cylindrical structure.

12. The habitation module of claim 11 wherein:
the portal chamber is hollow between the second inner cylindrical structure, the second outer cylindrical wall, and the second side walls for an exercise track; and
the gravity chamber includes a plurality of partitions that extend radially from the first inner cylindrical structure to the first outer cylindrical wall between the first side walls to define compartments within the gravity chamber.

13. The habitation module of claim 8 wherein:
the gravity chamber includes a divider orthogonal to the axis that divides the gravity chamber into a first annular sub-chamber and a second annular sub-chamber;
the first annular sub-chamber is hollow between the first inner cylindrical structure, the first outer cylindrical wall, a first one of the first side walls, and the divider for an exercise track; and
the second annular sub-chamber includes a plurality of partitions that extend radially from the first inner cylindrical structure to the first outer cylindrical wall, and between a second one of the first side walls and the divider to define compartments within the second annular sub-chamber.

14. The habitation module of claim 1 further comprising:
support bearings for attaching the portal chamber to the habitation module;
wherein the habitation module has a hull that defines an outer diameter of the habitation module, and a cylindrical core member encapsulated by the hull that extends through a center of the habitation module.

15. The habitation module of claim 14 wherein:
the support bearings each include an inner race attached to the cylindrical core member of the habitation module, and an outer race attached to the portal chamber.

16. The habitation module of claim 14 wherein:
the support bearings each include an outer race attached to an inner surface of the hull, and an inner race attached to the portal chamber.

17. The habitation module of claim 14 wherein:
the support bearings each include an inner race attached to an outer surface of the hull, and an outer race attached to the portal chamber.

18. A method of accessing a gravity chamber of a habitation module, the method comprising:
rotating a gravity chamber about an axis to simulate a gravitational force within the gravity chamber;
rotating a portal chamber about the axis adjacent to the gravity chamber;
disengaging an engagement mechanism of the portal chamber from the gravity chamber, wherein the engagement mechanism mechanically couples the portal chamber to the gravity chamber to impart rotation;
stopping the rotation of the portal chamber about the axis with a brake mechanism for a crew member to enter the portal chamber through a first access opening from an interior of the habitation module; and
engaging the gravity chamber with the engagement mechanism of the portal chamber to rotate the portal chamber about the axis at a speed of the gravity chamber for the crew member to pass through a second access opening of the portal chamber to an access opening of the gravity chamber.

19. The method of claim 18 further comprising:
locking the portal chamber to the gravity chamber with a lock mechanism when the second access opening of the portal chamber is directly adjacent to the access opening of the gravity chamber.

20. The method of claim 18 wherein engaging the gravity chamber with the engagement mechanism comprises:
applying pressure with a friction pad to a surface of the gravity chamber to engage the gravity chamber.

21. A method of exiting a gravity chamber of a habitation module, the method comprising:
rotating a gravity chamber about an axis to simulate a gravitational force within the gravity chamber;
rotating a portal chamber adjacent to the gravity chamber by engaging the gravity chamber with an engagement mechanism of the portal chamber to rotate the portal chamber about the axis at a speed of the gravity chamber, wherein a crew member is able to pass through an access opening of the gravity chamber to a first access opening of the portal chamber while the portal chamber rotates at the speed of the gravity chamber;
disengaging the portal chamber from the gravity chamber; and
stopping the rotation of the portal chamber about the axis with a brake mechanism to enable the crew member to exit the portal chamber through a second access opening into an interior of the habitation module.

22. The method of claim 21 further comprising:
locking the portal chamber to the gravity chamber with a lock mechanism when the crew member passes through the access opening of the gravity chamber to the first access opening of the portal chamber; and
unlocking the portal chamber from the gravity chamber with the lock mechanism before disengaging the portal chamber from the gravity chamber.

23. The method of claim 21 wherein disengaging the portal chamber from the gravity chamber comprises:
reducing pressure with a friction pad to a surface of the gravity chamber to disengage from the gravity chamber.

* * * * *